United States Patent
Harnois et al.

(10) Patent No.: US 6,792,473 B2
(45) Date of Patent: Sep. 14, 2004

(54) GIVING ACCESS TO NETWORKED STORAGE DEPENDENT UPON LOCAL DEMAND

(75) Inventors: Stephane Harnois, Laval (CA); Eric Yves Theriault, Montreal (CA)

(73) Assignee: Autodesk Canada Inc., Quebec (CA)

( * ) Notice: Subject to any disclaimer, the term of this patent is extended or adjusted under 35 U.S.C. 154(b) by 105 days.

(21) Appl. No.: 10/124,074

(22) Filed: Apr. 17, 2002

(65) Prior Publication Data

US 2003/0126224 A1 Jul. 3, 2003

(30) Foreign Application Priority Data

Apr. 20, 2001 (GB) .............................. 0109753

(51) Int. Cl.⁷ ...................... G06F 15/173; G06F 15/167
(52) U.S. Cl. ...................... 709/239; 709/213; 709/214; 710/38; 710/52; 710/316; 710/317; 345/501; 345/733; 714/6; 711/114
(58) Field of Search ................................ 709/213, 214, 709/238, 239, 240; 710/38, 52, 316, 317; 725/32; 707/9, 10; 345/502, 501, 733, 741; 714/6; 711/114

(56) References Cited

U.S. PATENT DOCUMENTS

| | | | |
|---|---|---|---|
| 5,471,592 A | | 11/1995 | Gove et al. |
| 5,818,542 A | * | 10/1998 | Harnois ...................... 348/594 |
| 6,337,691 B1 | * | 1/2002 | Trainor ...................... 345/537 |
| 6,389,432 B1 | * | 5/2002 | Pothapragada et al. ..... 707/205 |
| 6,404,975 B1 | * | 6/2002 | Bopardikar et al. .......... 386/46 |
| 6,542,954 B1 | * | 4/2003 | Aruga ........................ 710/316 |
| 2001/0029612 A1 | * | 10/2001 | Harnois ........................ 725/86 |
| 2002/0106184 A1 | * | 8/2002 | Belley et al. .................. 386/46 |
| 2002/0145749 A1 | * | 10/2002 | Catt et al. ................... 358/1.15 |
| 2002/0165930 A1 | * | 11/2002 | Theriault et al. ........... 709/214 |

FOREIGN PATENT DOCUMENTS

| | | |
|---|---|---|
| EP | 0 316 956 A2 | 5/1989 |
| EP | 0 535 807 A2 | 4/1993 |
| GB | 2 298 335 | 8/1996 |
| GB | 2 337 409 | 11/1999 |
| GB | 2 362 771 A | 11/2001 |
| JP | 11220475 A | 2/1998 |
| JP | 11331236 A | 5/1998 |
| WO | WO 90/05422 | 5/1990 |
| WO | WO 00/58856 | 10/2000 |
| WO | WO 01/54350 A2 | 7/2001 |

* cited by examiner

*Primary Examiner*—Hong Kim
(74) *Attorney, Agent, or Firm*—Gates & Cooper LLP

(57) ABSTRACT

Data is transferred over a network having many image data processing systems (101, 102). A high bandwidth network (121) is connected to each of the data processing systems and to each of several storage systems (111, 112). Each of the storage systems is operated under the direct control of one of the processing systems. A request is issued from a first processing system to access a data storage system controlled by a second processing system over a low bandwidth network (151). A bandwidth assessment process assesses an extent to which the second processing system requires access to its local storage system. The first processing system is given access to the second storage system if an assessment is made to the effect that local access requirements are identified as being below a predetermined threshold.

20 Claims, 29 Drawing Sheets

| | FRAME ID | STORAGE LOCATION | APP FIELD | HARD PARTITION ID | INDEX | TIMESTAMP |
|---|---|---|---|---|---|---|
| | 701 | 702 | 703 | 704 | 705 | 706 |
| 711 | 561000001 | 040000 | Soft Partition | A:\ | 001 | 01:00:01 |
| 712 | 561000002 | 040001 | Image | A:\ | 002 | 01:00:02 |
| | 561000003 | 040002 | Image | A:\ | 003 | 01:00:03 |
| | 561000004 | 040003 | Soft Partition | A:\ | 004 | 01:10:08 |
| | 561000005 | 040004 | Image | B:\ | 005 | 01:11:09 |
| | 561000006 | 040005 | Soft Partition | B:\ | 006 | 02:00:07 |
| | 561000007 | 040006 | Image | | 007 | 02:00:15 |

| SYSTEM ETHERNET ADDRESS | SYSTEM SWITCH ADDRESS | FRAMESTORE SWITCH ADDRESS |
|---|---|---|
| 192.168.25.42 | 0x01000001 | 0x01000011 |
| 192.168.25.52 | 0x01000002 | 0x01000016 |
| 192.168.25.54 | 0x01000003 | 0x01000009 |
| 192.168.25.56 | 0x01000004 | 0x01000012 |
| 192.168.25.64 | 0x01000005 | 0x01000013 |
| 192.168.25.65 | 0x01000006 | 0x01000014 |
| 192.168.25.72 | 0x01000007 | 0x01000015 |
| 192.168.25.74 | 0x01000008 | 0x01000010 |

*Figure 8*

```
901 ──┐┌─FRAMESTORE=BRAZIL      HADDR=192.168.25.56  ID=56       343
        FRAMESTORE=SCOTLAND    HADDR=192.168.25.74  ID=74
        FRAMESTORE=FINLAND     HADDR=192.168.25.72  ID=72
        FRAMESTORE=AUSTRIA     HADDR=192.168.25.54  ID=54
        FRAMESTORE=SYRIA       HADDR=192.168.25.64  ID=64
        FRAMESTORE=KUWAIT      HADDR=192.618.25.42  ID=42
        FRAMESTORE=BOLIVIA     HADDR=192.168.25.65  ID=65
        FRAMESTORE=ARGENTINA   HADDR=192.168.25.52  ID=52
```

*Figure 9*

| ISSUER | LOCATION | SIZE |
|---|---|---|
| 192.168.25.64 | 040112 | 4 |
| 192.168.25.64 | 040113 | 4 |
| 192.168.25.64 | 040114 | 4 |
| . | . | . |
| . | . | . |
| . | . | . |
| 192.168.25.64 | 040136 | 4 |
| 192.168.25.65 | 020036 | 2 |
| 192.168.25.65 | 020037 | 2 |
| . | . | . |
| . | . | . |
| . | . | . |
| 192.168.25.65 | 020052 | 2 |
| 192.168.25.72 | 012221 | 1 |
| 192.168.25.72 | 012222 | 1 |
| . | . | . |
| . | . | . |
| . | . | . |
| 192.168.25.72 | 013008 | 1 |

*Figure 18*

|  1019   |  2101  |  2102  |  2103  |

| ISSUER | LOCATION | SIZE |
|---|---|---|
|  | 060010 | 6 |
|  | 060011 | 6 |
|  | 060012 | 6 |
|  | 060013 | 6 |
|  | 060014 | 6 |
|  | 060015 | 6 |
|  | 060016 | 6 |
| 192.168.25.64 | 040352 | 4 |
|  | 060017 | 6 |
|  | 060018 | 6 |
|  | 060019 | 6 |
| 191.168.25.84 | 040353 | 4 |
|  | 060020 | 6 |
|  | 060021 | 6 |

*Figure 21*

GIVING ACCESS TO NETWORKED STORAGE DEPENDENT UPON LOCAL DEMAND

CROSS REFERENCE TO RELATED APPLICATIONS

This application is related to the following co-pending and commonly-assigned patent applications/patents, which applications/patents are incorporated by reference herein:

U.S. patent application Ser. No. 09/738,478, entitled "LOW BANDWIDTH REQUESTS FOR HIGH BANDWIDTH NETWORK ACCESS", filed on Dec. 15, 2000 by Stephane Harnois, U.S. patent application Ser. No. 09/925,597, entitled "IMAGE PROCESSING", filed on Aug. 9, 2001 by Eric Yves Theriault, et. al.; and U.S. patent application Ser. No. 10/124,093, entitled "DATA STORAGE WITH STORED LOCATION DATA TO FACILITATE DISK SWAPPING", filed on Apr. 17, 2002 by Eric Yves Theriault, et. al.

FIELD OF THE INVENTION

The present invention relates to a network system for image data processing systems and data storage systems, in which access to data storage systems is controlled by bandwidth management means.

BACKGROUND OF THE INVENTION

Devices for the real time storage of image frames, derived from video signals or derived from the scanning of cinematographic film, are disclosed in the present assignee's U.S. Pat. No. 6,118,931. In the aforesaid patent, systems are shown in which image frames are stored at display rate by accessing a plurality of storage devices in parallel under a process known as striping.

Recently, there has been a trend towards networking a plurality of systems of this type, thus allowing systems to gain access to a number of different storage devices. However, accessing such storage devices at display rate requires expensive, high bandwidth networks.

Co-pending British patent applications 0008318.8, 0109753.4, and 2034-P564-GB describe methods of using a high bandwidth fibre channel switch, connected to a plurality of image processing systems and a plurality of redundant arrays of inexpensive disks (RAIDs), to convey image data over a high bandwidth channel without the cost of setting up a high bandwidth network. This is achieved by requesting access to data stored in a RAID controlled by another system.

Currently, such access involves the first processing system controlling a RAID allowing a second processing system unlimited access to the RAID for a short period of time before requesting the return of the RAID. This means that access by said second processing system can only take place when said first processing system is not accessing the RAID itself.

BRIEF SUMMARY OF THE INVENTION

A networked image data processing environment, comprising a plurality of image data processing systems, a plurality of data storage systems, wherein each of said data storage systems is operated under the direct control of one of said image processing systems, a high bandwidth network connected to each of said data processing systems, a low bandwidth network connecting said image processing systems and said switching means, by which one of said processing systems controls the operation of said switching means, wherein a first processing system includes requesting means configured to request access to a data storage system controlled by a second processing system over said low bandwidth network, said second processing system includes bandwidth assessment means configured to assess an extent to which said second processing system requires access to said storage system; and comparison means configured to make an indication of storage regions that may be accessed if said extent is below a predetermined threshold.

BRIEF DESCRIPTION OF THE SEVERAL VIEWS OF THE DRAWINGS

FIG. 7 details location data as shown in FIG. 8;

FIG. 8 illustrates an example of a switch-connections table as shown in FIG. 3;

FIG. 9 shows an example of a network configuration file as shown in FIG. 3;

FIG. 18 illustrates a remote queue as shown in FIG. 10;

FIG. 21 illustrates a main queue as shown in FIG. 10;

BEST MODE FOR CARRYING OUT THE INVENTION

FIG. 1

Figure 1:
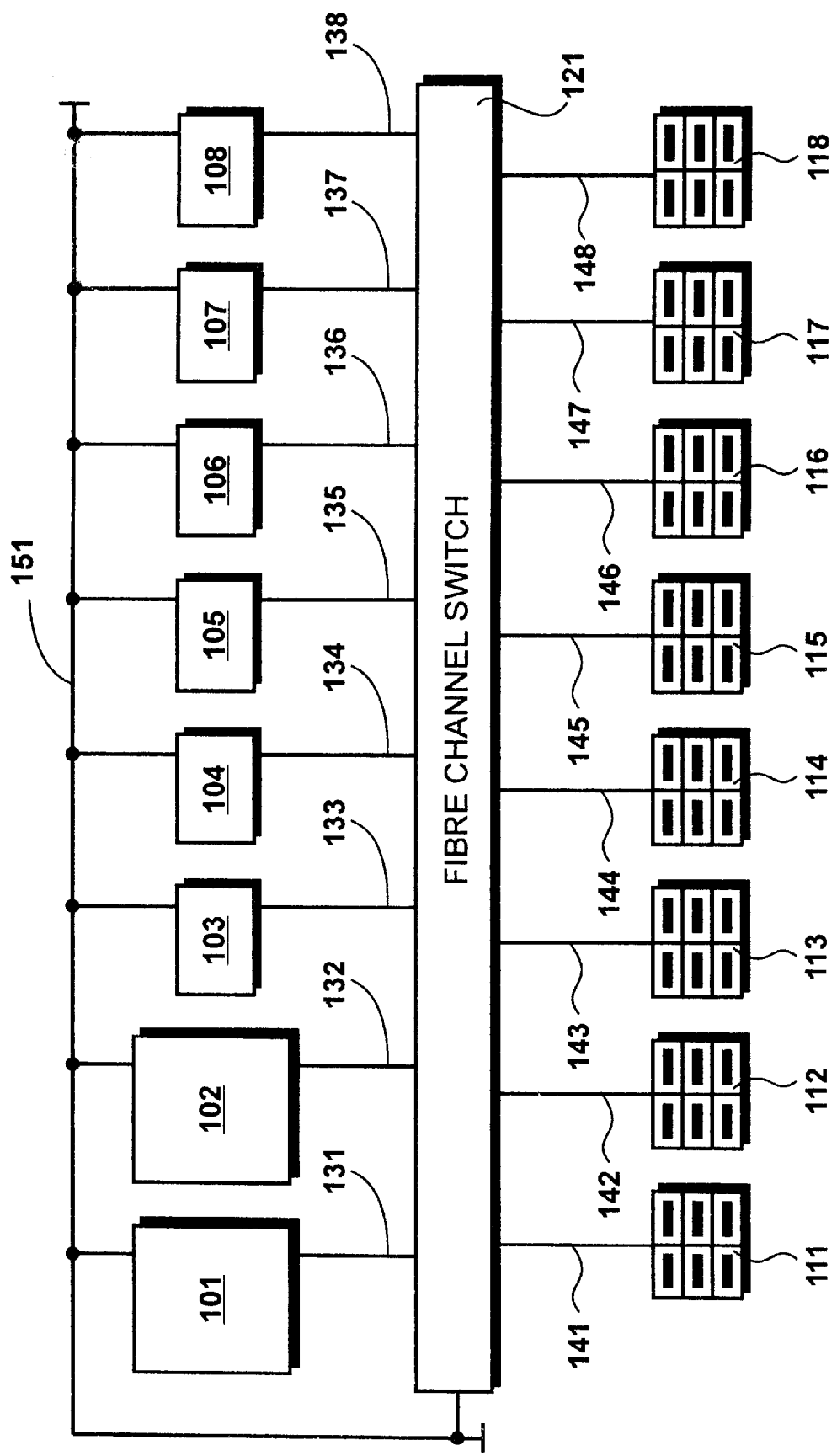
FIG. 1 shows a data processing environment, including image data processing systems and frame storage disk arrays.

An example of a networked image data processing environment is illustrated in FIG. 1. An environment of this type is described in the present assignee's co-pending United Kingdom Patent Application No. 00 08 318. The network includes eight image data processing systems 101, 102, 103, 104, 105, 106, 107 and 108. Each processing system 101 to 108 has a respective frame storage disk array (hereafter referred to as framestores) 111, 112, 113, 114, 115, 116, 117 and 118. For example, each framestore 111 to 118 may be of the type supplied by the present assignee under the Trademark "STONE" and includes several high capacity hard disk drives arranged to supply and store image data in parallel across many individual drives at once. The drives are configured as a redundant array of inexpensive disks (RAID). Further details of the RAID system are disclosed in British Patent No 2 312 319 (U.S. Ser. No. 08/843,282) assigned to the present Assignee. Each of the framestores is operated under the direct control of its respective processing system. Thus, framestore 111 is operated under the direct control of image data processing system 101 and framestore 113 is operated under the direct control of off-line processing system 103.

The environment includes a sixteen port non-blocking fibre channel switch type 121, such as the type made available under the trademark 'GADZOOX'. The switch is employed within the data processing environment to allow fast full bandwidth accessibility between each processing system 101 to 108 and each framestore 111 to 118. Each data processing system 101 to 108 is connected to the fibre channel switch by a respective fibre channel cable 131 to 138. Similarly, each framestore is connected to the fibre channel switch via a respective fibre channel cable 141 to 148. An Ethernet network 151 allows communication between the data processing systems 101 to 108 and the fibre channel switch 121. In an alternative embodiment of the present invention, a medium-bandwidth 'HiPPI' network (not shown) allows communication between said data processing systems 101 to 108 and said fibre channel switch 121.

Within the environment, a single processing system, such as system 101, is selected as channel switch master. Under these conditions, it is not necessary for all of the processing systems to be operational but the master system 101 must be on-line before communication can take place through the switch. However, in most operational environments, all of the processing systems would remain operational unless taken off-line for maintenance or upgrade etc. Processing system 101 communicates with the fibre channel switch 121 over the Ethernet network 151 or the HiPPI network. Commands issued by processing system 101 to the fibre channel switch define physical switch connections between processing systems 101 to 108 and framestores 111 to 118.

These connections within the fibre channel switch can connect a processing system to a framestore which it does not control. Hence, although each framestore is controlled by only one of processing systems 101 to 108, it is possible for a processing system to gain access to a framestore controlled by another processing system.

For example, if processing system 102 requires to read frames from framestore 113, then processing system 102 issues requests for these frames over Ethernet 151 to processing system 103 which controls framestore 113. When access is possible, processing system 103 sends processing system 102 the locations of the frames and requests processing system 101 to temporarily connect processing system 102 with framestore 113.

On start-up, the fibre channel switch 121 is placed in the default condition to the effect that each processing system is connected through the switch 121 to its respective framestore. Thus, on booting up of processing system B, for example, it mounts framestore 112. The information necessary to make these default connections is stored in a switch connections table on processing system 101, an example of which is illustrated in FIG. 8.

FIG. 2

Figure 2:
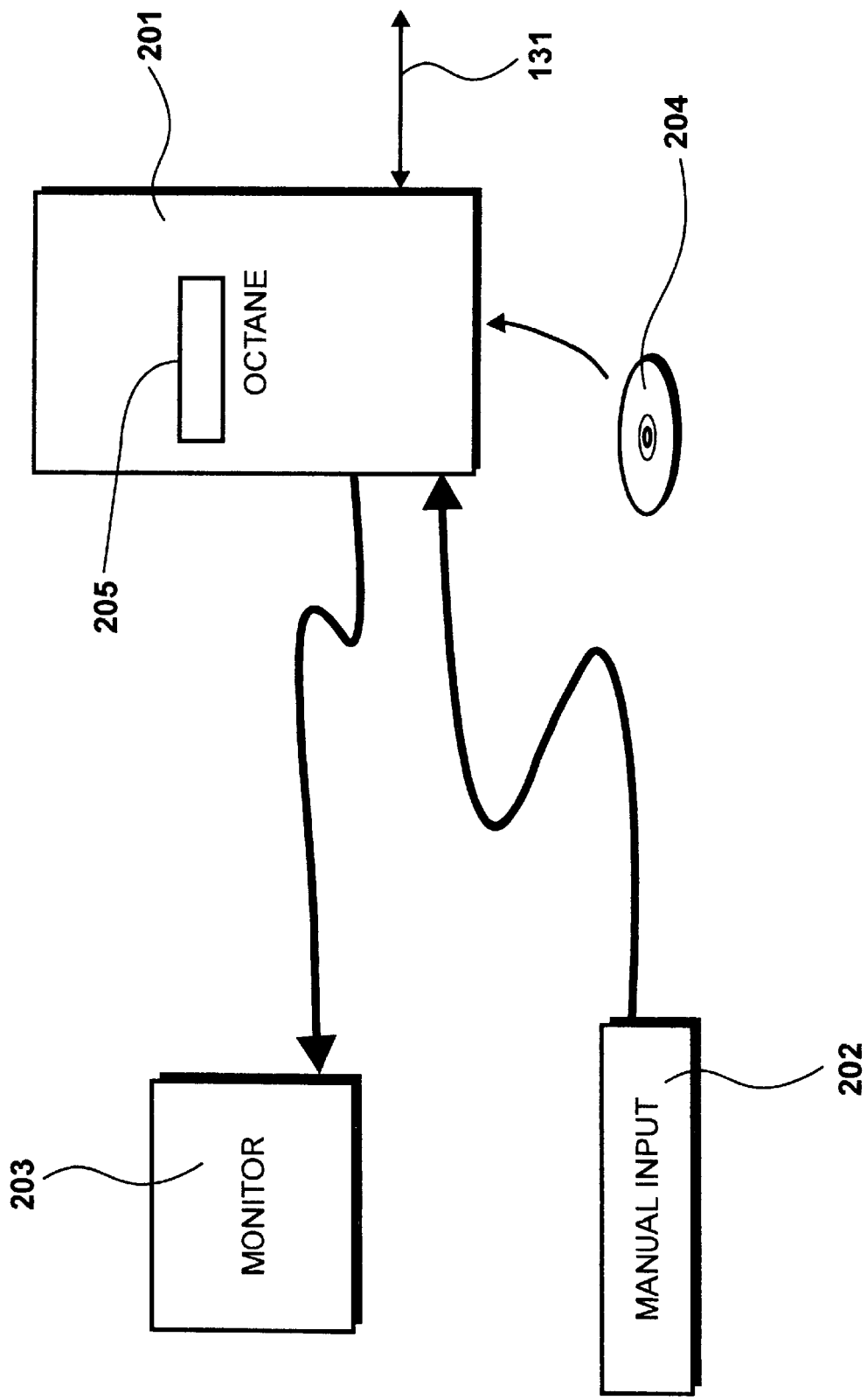
FIG. 2 illustrates an on-line processing system as shown in FIG. 1.

An image data processing system, such as processing system 101, is illustrated in FIG. 2, based around a silicon graphics octane processor 201 configured to receive manual input signals from manual input devices 202 (such as a keyboard, mouse, stylus and touch tablet etc.) and is arranged to supply output signals to a display monitor 203. Operating instructions are loaded into the octane processor 201, and thereafter stored on a local disk, via a data carrying medium, such as a CD ROM 204 receivable within a CD ROM reader 205. Program instructions are stored locally within the Octane 201 but frames of image data are stored on framestore 113. The processor 201 is connected to the fibre channel switch by connection 131.

FIG. 3

Figure 3:
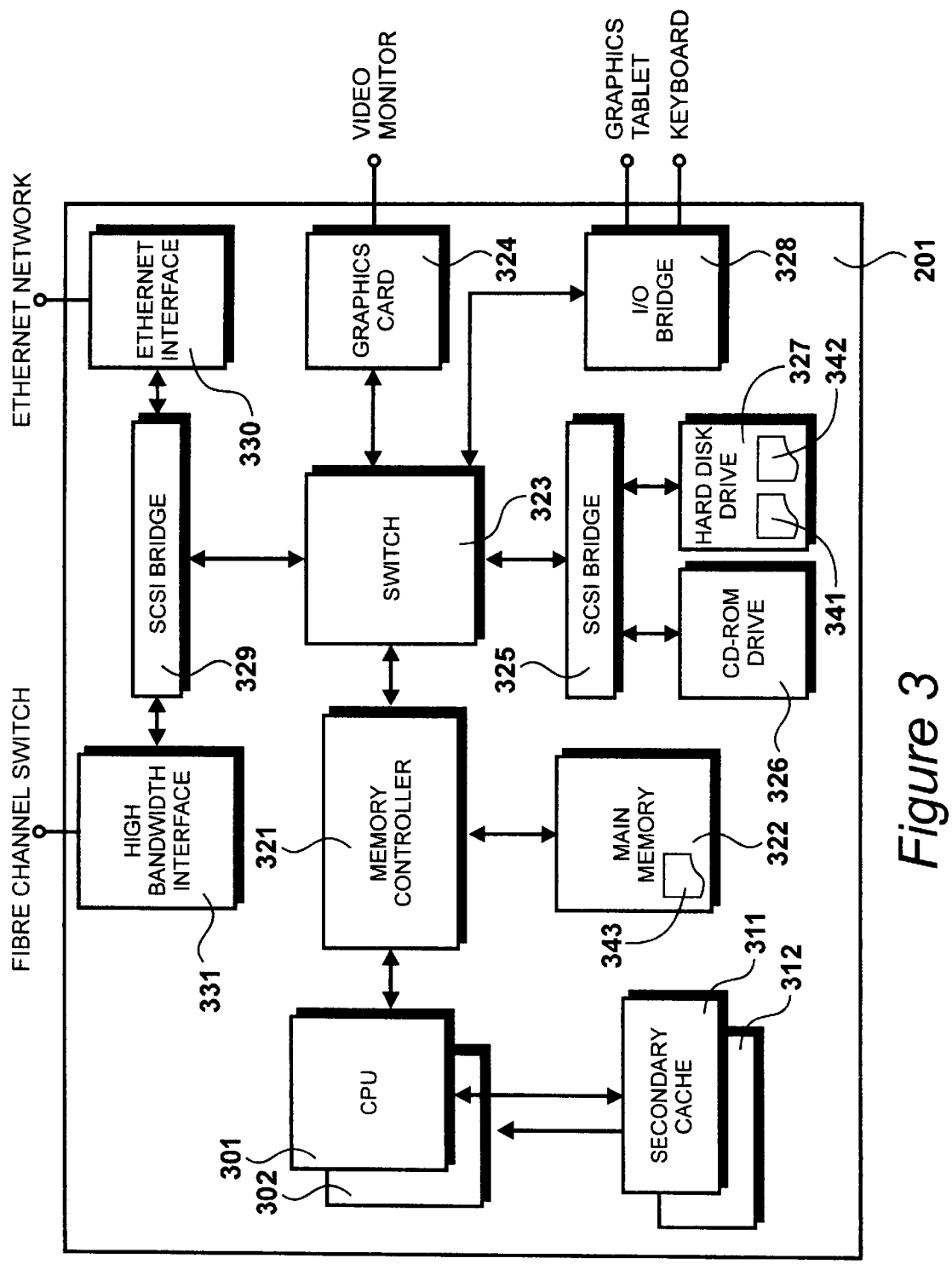
FIG. 3 details an Octane processor as illustrated in FIG. 2.

The Octane processor 201 shown in FIG. 2 is detailed in FIG. 3. The processing system 201 comprises two central processing units 301 and 302 operating in parallel. Each of these CPUs 301 and 302 has a dedicated secondary cache memory 311 and 312 that facilitate per-CPU storage of frequently used instructions and data. Each CPU 301 and 302 further includes separate primary instruction and data cache memory circuits on the same chip, thereby facilitating a further level of processing improvement. A memory controller 321 provides a common connection between the CPUs 301 and 302 and a main memory 322. The main memory 322 comprises two gigabytes of dynamic RAM.

The memory controller 321 further facilitates connectivity between the aforementioned components of the octane processor 201 and a high bandwidth non-blocking crossbar switch 323. The switch makes it possible to provide a direct high capacity connection between any of several attached circuits, including a graphics card 324. The graphics card 324 generally receives instructions from the CPUs 301 and 302 to perform various types of graphical image rendering processes, resulting in images, clips and scenes being rendered in real time.

A SCSI bridge 325 facilitates connection between the crossbar switch 323 and a CDROM drive 326. The CDROM drive provides a convenient way of receiving large quantities of instructions and data, and is typically used to install instructions for the processing system 201 onto a hard disk drive 327. Once installed, instructions located on the hard disk drive 327 may be transferred into main memory 322 and then executed by the CPUs 301 and 302. An input output (I/O) bridge 328 provides an interface for the manual input device 202, through which the user is able to provide instructions to the processor 201.

A second SCSI bridge 329 facilitates connection between the crossbar switch 323 and network communication interfaces. Ethernet interface 330 is connected to the Ethernet network 151 and high bandwidth interface 331 is connected to the fibre channel switch 121 by connection 131. In an alternative embodiment of the present invention, interface 330 is connected to the medium bandwidth HiPPI network.

Stored on the hard drive 327 of processor 201 is metadata 341. This is data relating to the location and format of images stored on the framestore which processing system 101 currently controls, without which said images cannot be accessed. Each of processing systems 102 to 108 has on its hard drive similar metadata relating to its respective framestore.

Also stored on the hard drive 327 is switch connection table 342. This is only on processing system 101, so that processing systems 102 to 108 are identical to system 101 in every way except that they do not have table 342. This is because processing system 101 is the switch-control master.

Switch connection table 342 gives details about the physical connections inside the fibre channel switch which connect framestores and their controlling processing systems, and enables processing system 101 to reset the connections when a processing system has accessed a framestore which it does not control.

A network configuration file 343 is stored in the main memory 322 of processor 201. This contains information about how to contact each of the on-line framestores, and also informs a user if a framestore is not currently available to access because its controlling processing system has been taken off-line. Network configuration file 343 is written when processing system 101 starts up and is continually updated all the time that processor 201 is switched on.

When processing system 101 starts up it announces its local connections to all other on-line processing systems within the network and receives answers from each of them about their local connections. Network configuration file 343 is compiled from these answers, while all other processing systems add the details of system 101 to their respective network configuration files. Similar processes take place when a processing system shuts down, crashes or swaps framestores with another processing system.

Network configuration file 343 is different from switch connection table 342 in that file 343 identifies framestores according to an ID and a name and associates them with the Ethernet address of the controlling processing system. Table 342 only contains information about the connections within the fibre channel switch and includes no information about the framestores, although it still associates each connection with the Ethernet address of the controlling processing system.

Also, there is a network configuration file in the memory of each of processing systems 101 to 108, whereas switch connection table 342 is only stored on processing system 101.

FIG. 4

Figure 4:
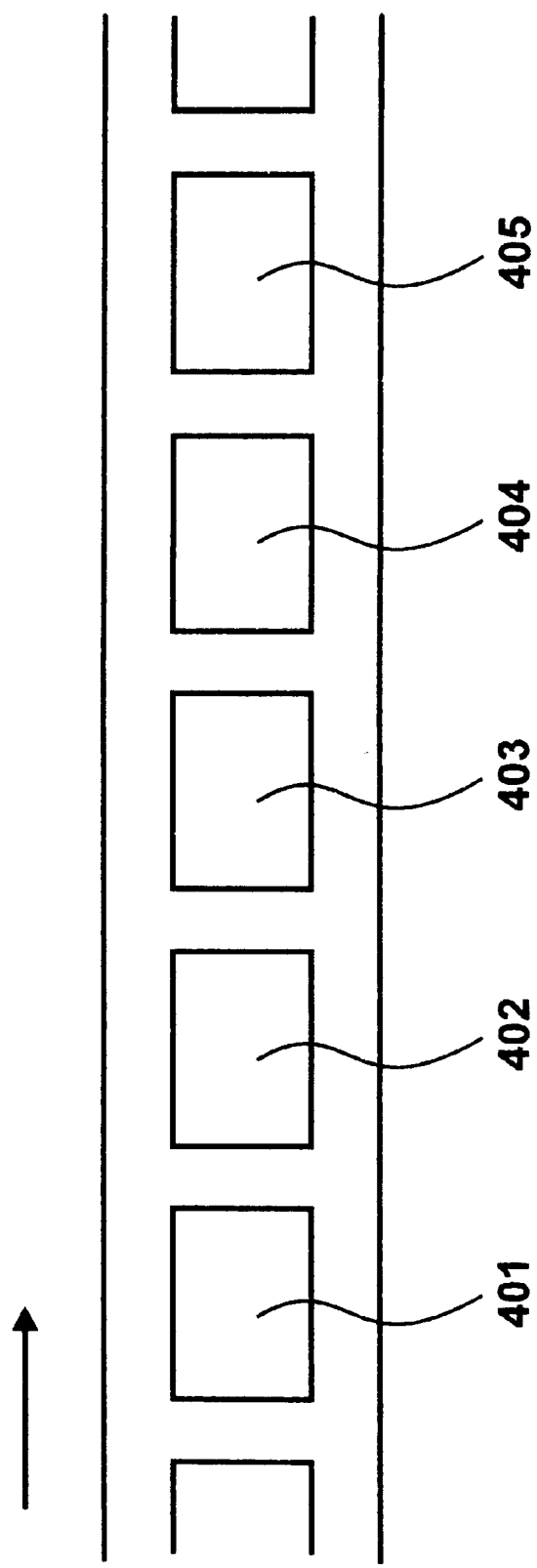
FIG. 4 illustrates image frames of the type processed by the system shown in FIG. 1.

A plurality of video image frames 401, 402, 403, 404 and 405 are illustrated in FIG. 4. Each frame in the clip has a unique frame identification (frame ID) such that, in a system containing many clips, each frame may be uniquely identified. In a system operating with standard broadcast quality images, each frame consumes approximately one megabyte of data. Thus, by conventional computing standards, frames are relatively large. Therefore even on a relatively large disk array the total number of frames that may be stored is ultimately limited. An advantage of this situation, however, is that it is not necessary to establish a sophisticated directory system thereby assisting in terms of frame identification and access.

FIG. 5

Figure 5:
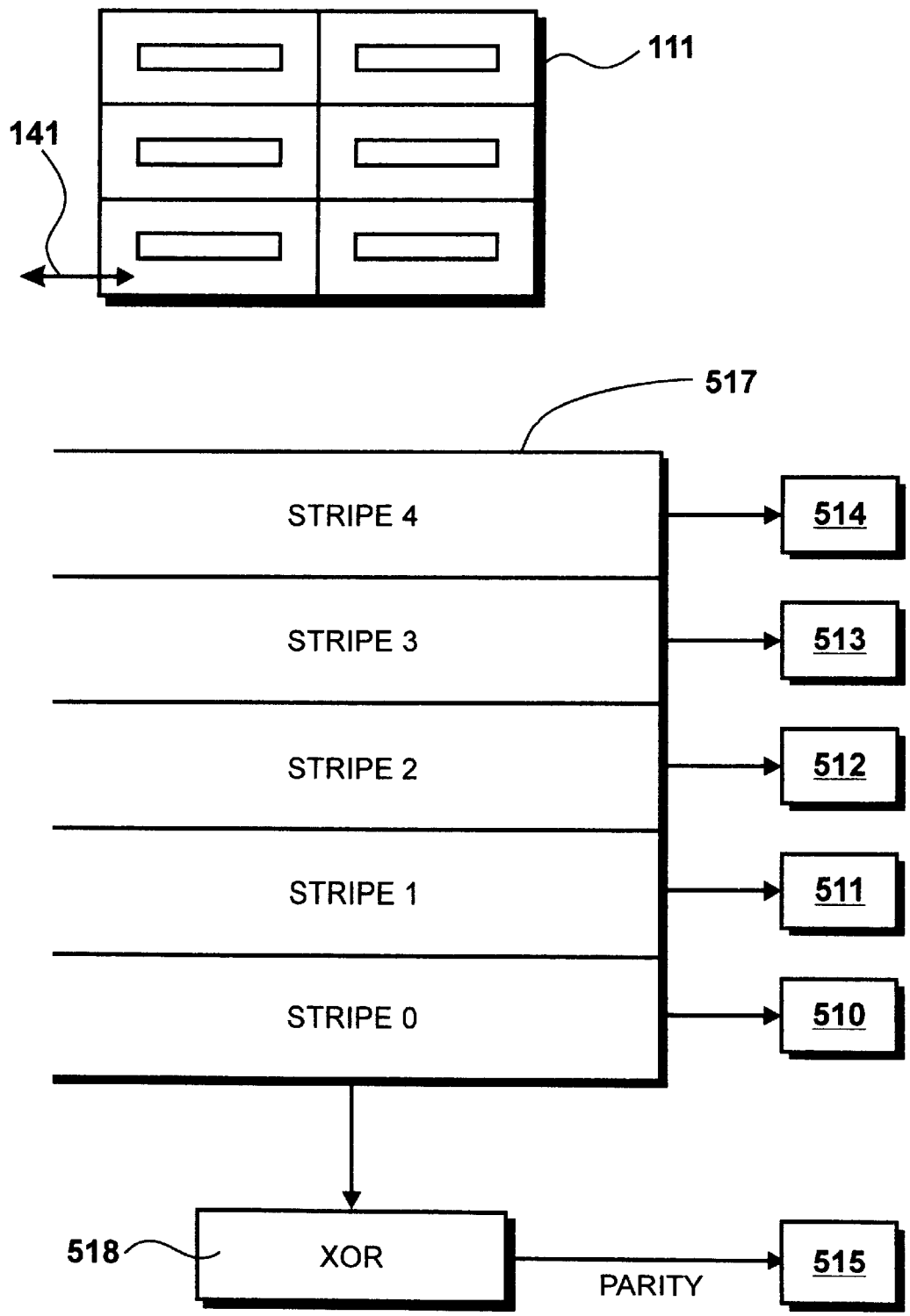
FIG. 5 illustrates a redundant array of inexpensive disks accessed by a fibre channel interface.

A framestore, such as framestore 111, is illustrated in FIG. 5. The framestore 111, connected to the fibre channel switch by fibre channel 141, includes five physical hard disk drives, illustrated diagrammatically as drives 510, 511, 512, 513 and 514. In addition to these five disks configured to receive image data, a sixth redundant disk 515 is provided.

An image field 517, stored in a buffer within memory, is divided into five stripes identified as stripe zero, stripe one, stripe two, stripe three and stripe four. The addressing of data from these stripes occurs using similar address values with multiples of an off-set value applied to each individual stripe. Thus, while data is being read from stripe zero, similar address values read data from stripe one but with a unity off-set. Similarly, the same address values are used to read data from stripe two with a two unit off-set, with stripe three having a three unit off-set and stripe four having a four unit off-set. In a system having many storage devices of this type and with data being transferred between storage devices, a similar striping off-set is used on each system.

As similar data locations are being addressed within each stripe, the resulting data read from the stripes is XORed together by process 518, resulting in redundant parity data being written to the sixth drive 515.

Thus, as is well known in the art, if any of disk drives 510 to 514 should fail it is possible to reconstitute the missing data by performing a XOR operation upon the remaining data. Thus, in the configuration shown in FIG. 5, it is possible for a damaged disk to be removed, replaced by a new disk and the missing data to be re-established by the XORing process. Such a procedure for the reconstitution of data in this way is usually referred to as disk healing.

FIG. 6

Figure 6:
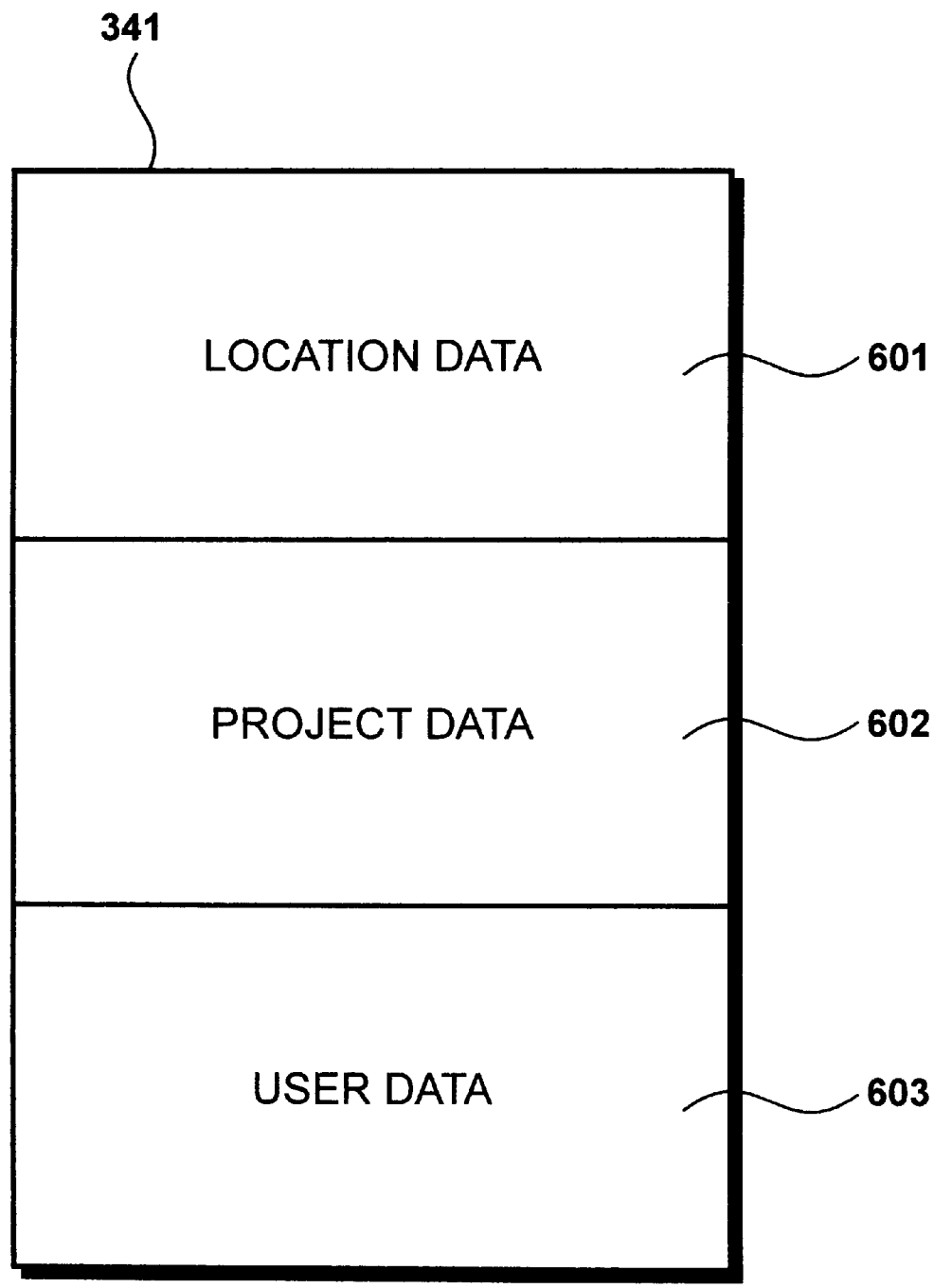
FIG. 6 shows an example of metadata contained on a hard drive as shown in FIG. 3.

FIG. 6 shows metadata 341. The metadata comprises location data 601, project data 602 and user data 603. Location data 601 is used to identify the location of frames within framestore 111. Location data 601 is stored in the 'STONE' file system and known to those skilled in the art as an 'Inode table', which is loaded in the memory 322 of the owning system.

Project data 602 contains information concerning how the frames are grouped together into clips. In addition, these clips may be grouped together into projects, such as commercials or films. This information allows the contents of the framestore to be displayed to a user in a format by which frames, clips or entire projects may be selected. It also allows the contents of a framestore to be displayed on a processing system which does not control that framestore, without divulging the actual locations of frames.

User data 603 contains user preferences which influence the displaying of the frames.

FIG. 7

FIG. 7 details location data 601. Column 701 lists the frame identification references (frame IDs) of all the frames stored within the framestore controlled by processing system 101. Each frame ID contains a two-digit number corresponding to the framestore identification reference (framestore ID), so that the framestore on which an image is stored can be immediately identified from the frame ID. The remaining digits within each frame ID uniquely identify each frame within that framestore.

Column 702 gives a unique location within the framestore for each of these frames. The first two digits give the partition of the framestore. There exists two different types of partitions within a framestore as described in the present embodiment. Firstly, a framestore can be divided into 'hard' partitions, which would appear to a user as separate and distinct segments of a same device. Secondly, a framestore can be further divided into 'soft' partitions, which a user defines in order to link data to a project, wherein said data is not necessarily contiguous. It should be noted that a framestore does not need to be initially hard-partitioned for a user to set soft partitions up. Thus, in the preferred embodiment, each framestore is soft-partitioned such that frames of different definitions, and therefore of different sizes, are stored in different soft partitions, thus making most efficient use of the storage. Within each partition, every frame is the same size, and hence it is only necessary to give a number corresponding to how many frames are stored before the particular frame in that partition.

A soft partition is a data structure stored as frame on the framestore. Each frame is equipped with a 'tag' that identifies it as a specific structure from a plurality of existing structures, such as soft partitions, images, audio tracks etc. Accordingly, column 703 provides a 'tag' to identify each subsequent frame as one of said specific structure, and it can be for instance observed that Frame 561000007 is identified as a soft partition. Each frame sequentially listed after a frame identified as a soft partition will therefore be stored within said soft partition, until a new soft partition is established.

A number of further columns are provided in order to further reference each frame stored in framestore 111. Column 704 references the hard partition each subsequent frame within column 701 is stored in, if the framestore has been hard-partitioned. It can be for instance observed that Frame 561000007 is located in segment B of framestore 111, whereas 561000001 is located in segment A of said framestore. Column 705 is a referencing column, which provides a unique index number for each subsequent frame within column 701 in the 'Inode table'. Finally, column 706 provides a unique timestamp which records the creation of every subsequent frame stored in framestore 111.

In the example, partitions are numbered according to the amount of data in the frames that the partitions store. Hence partition 30 contains frames of 30 megabytes each, while partition 01 contains frames of only 1 megabyte each.

For example, in FIG. 7 line 711 gives the information that the frame with ID 561000001 is stored at location 040000. This means that it is stored in partition 04 and that it is the first frame in that partition. Accessing this frame is a matter of knowing that every frame in partition 04 takes up 4 megabytes, and so reading 4 megabytes starting from the beginning.

Line 712 gives the frame with ID 561000002 and location 040001, meaning that it is in partition 04 and that there is one frame stored before it. Hence accessing this frame means skipping the first 4 megabytes and reading the next 4 megabytes.

This method of storing locations is very efficient and means that the amount of space in a framestore can always be calculated in terms of a number of frames, by means of calculating the number of remaining free 'node table' entries or remaining free stripes, rather than a number of megabytes or gigabytes.

Location data 601 is used whenever a processing system accesses framestore 111, whether it is the controlling system 101 or another system. For instance, if processing system 106 wishes to access framestore 111, system 101 must retrieve the location of the desired frames from location data 601, and also any other information about the frames which may be stored in project data 602 or user data 603, and return this information to processing system 106 before access can be achieved.

FIG. 8

FIG. 8 shows the switch connections table 342 stored on the hard drive 327 of processing system 101. Every processing system is listed in this table. Column 801 gives the Ethernet address of a processing system, column 802 gives the switch address of a processing system and column 803 gives the switch address of the framestore which it currently controls.

This table is used by the switch-controlling daemon on processing system 101 to reconnect a framestore and its controlling processing system whenever another processing system has been allowed access or if the processing system has been rebooted.

All processing systems are listed, whether they are presently switched on and connected to the network or not, so that the switch connections table 342 cannot be used to distinguish between on- and off-line systems. This is because a switch connection between an off-line system and its respective framestore must be maintained so that when the system comes on-line it can immediately mount the framestore.

FIG. 9

FIG. 9 shows network configuration file 343. Each line gives information about a connection between one framestore and one processing system. Line 901 shows framestore 'Brazil'. This is the name given to this framestore to make differentiating between framestores easier for users. HADDR stands for Hardware Address, and this gives the Ethernet address of the processing system which currently controls framestore 'Brazil'. 56 is the identification reference of this framestore. Reference to FIG. 7 shows that this is framestore 111 controlled by processing system 101, since the frame IDs which comprise location data 601 all contain the framestore ID 56.

Any framestore which is not listed in network configuration file 343 is not available for access, since this means that its controlling processing system is off-line.

Network configuration data 343 is referred to when an address for the processing system controlling a particular framestore is needed. For instance, if processing system 106 requires access to framestore 112, network configuration file 343 supplies the Ethernet address for processing system 102 which controls it, so that processing system 106 knows where to send the request for access.

This request by processing system 106 to access framestore 112 will be refused by processing system 102 if processing system 102 is itself accessing framestore 112 at the time the request is made. Processing system 102 must be at liberty to refuse requests if it needs high bandwidth access to framestore 112, and the present environment ensures this by requiring a processing system to refuse all requests if it is accessing its own framestore, no matter how trivial that access may be. It could be that both processing system 102 and processing system 106 require very small amounts of data and could both access without hindering each other, but allowing remote access could jeopardise access by processing system 102 when the amount of data is large.

Another difficulty with this environment is that if the request from processing system 106 is granted then processing system 102 will effectively hand over access to framestore 112 for a period of time, during which period processing system 102 will be unable to access its own framestore.

The present invention describes a way in which two or more processing systems may access a single framestore virtually simultaneously, but in such a way that the access by a processing system to its own storage is never compromised. This invention may be carried out in the same environment as that described in FIG. 1.

FIG. 10

Figure 10:
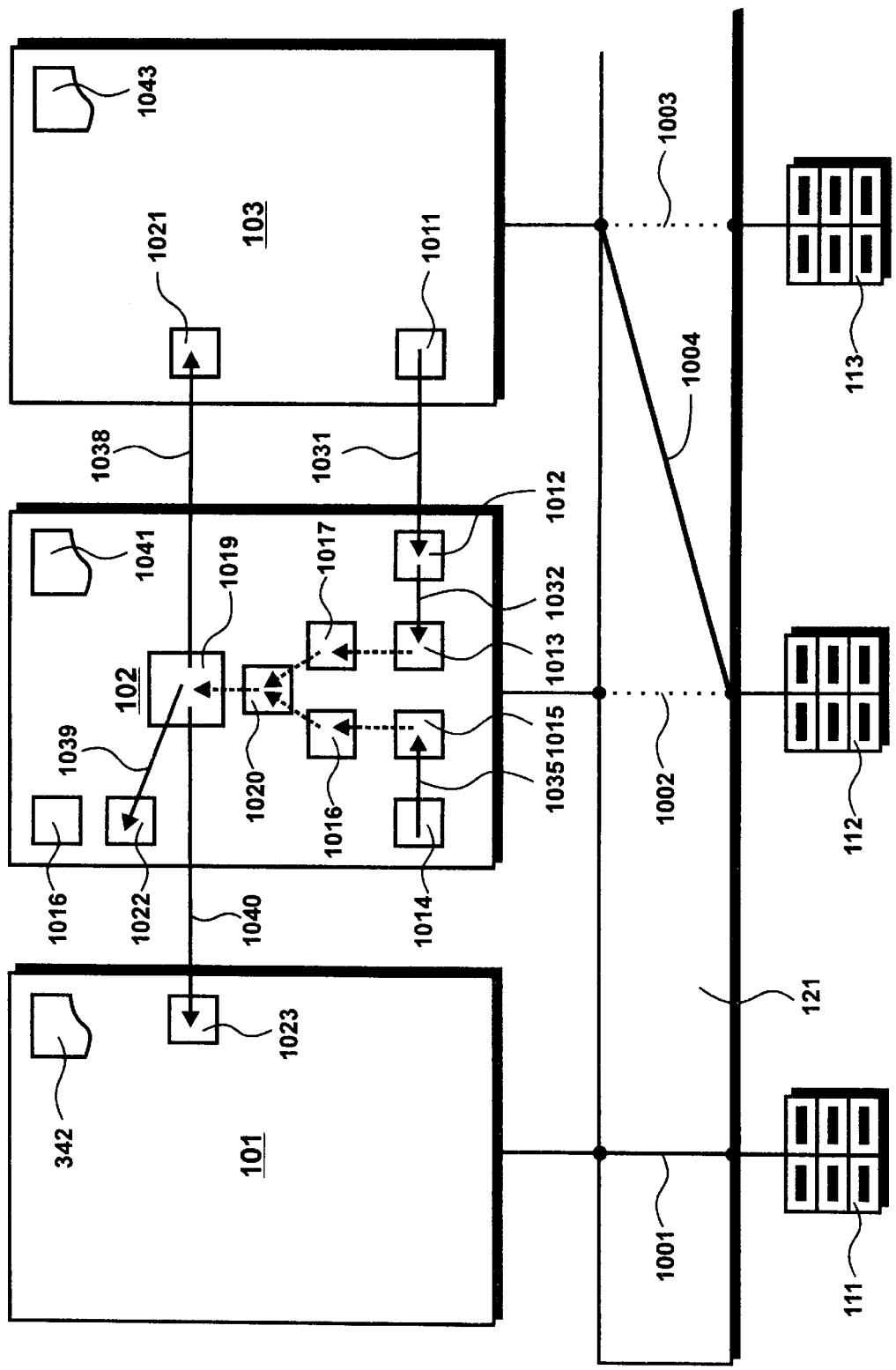
FIG. 10 shows communication between the threads, processes and queues that embody the invention.

FIG. 10 illustrates the embodiment of the invention. Three processing systems are illustrated, 101, 102 and 103, together with their respective framestores 111, 112 and 113. Each processing system is connected to its respective framestore via fibre channel switch 121, as illustrated by connections 1001, 1002 and 1003.

Processing system 103 has network configuration file 1043 stored in the memory of its processor, which is identical to network configuration file 343 shown in FIG. 9. Each of processing systems 101 to 108 has an identical network configuration file in its memory, but in FIG. 10 only that on processing system 103 is shown.

Processing system 102 has metadata 1041 on its hard drive, containing information about framestore 112, similar to metadata 341 shown in FIG. 6 and containing location data similar to location data 601 shown in FIG. 7. Each of processing systems 101 to 108 has metadata on its hard drive but in FIG. 10 only that on processing system 102 is shown.

Only processing system 101 contains switch connection table 342, since only processing system 101 contains switch-controlling daemon 1023.

This figure illustrates processing system 103 requesting access to framestore 112. Access is in the form of read requests. Remote request process 1011 on processing system 103 sends read requests via the Ethernet or HippI to processing system 102, as illustrated by path 1031.

Remote queue thread 1012 on processing system 102 receives these read requests and places them in remote queue 1013 on processing system 102, as illustrated by path 1032.

Meanwhile, processing system 102 makes requests for its own framestore 112. Again, these are read requests, produced by the local request process 1014 and placed into local queue 1015 as illustrated by path 1034.

Hence there may at any time be requests from the controlling system for access to its own framestore in local queue 1015 and requests from any other processing system in remote queue 1013.

When processing system 102 reads frames from its own framestore it buffers frames in memory buffer 1016. This can store a large number of frames, depending on how large those frames are.

When processing system 102 requests frames, they are written to buffer 1016 before the displaying of frames to the user begins. Hence, once the buffer is full, the rate at which frames must be accessed and stored to the buffer is the rate at which they are displayed to the user, typically 30 frames per second. Depending on the size of the frames, this may be much less than the available bandwidth of the framestore and so limited access by other processing systems would not jeopardise access by processing system 102. Even if access by processing system 102 were slowed down slightly, this could be compensated for by then not allowing remote access for a time.

Local queue management thread 1017 places requests from local queue 1015 into main queue 1019 according to how much space is left in buffer 1016. If there is more space in the buffer than the remaining requests in the local queue will take up, then all the requests are placed in the main queue and the daemon waits for more requests to arrive in the local queue.

Remote access is allowed depending on how many requests there are in the main queue and how large they are. Remote queue management daemon places a request from remote queue 1013 into main queue 1019 whenever the total amount of data required by the requests in the main queue falls below a preset threshold T. T is the amount of data for which it is considered acceptable for the buffering to fall behind. For example, T may be set at a second of data, which for frames of 2 megabytes each at 30 frames per second would be 60 megabytes. Thus if the main queue contained 60 megabytes of remote requests the host processing system would lose the equivalent of a second of data, but it would be possible, by then filling up the main queue with local requests, to 'catch up' before the buffer emptied.

T is calculated according to how large the frames are in the local queue, but a value S is set which can only be changed manually. S is set as the number of frames which it is permissible to fall behind by, so in the above example S would be set at 30. S is calculated by a system administrator by balancing how important it is that realtime access is not jeopardised and how important it is that remote access should be fast.

Once requests, whether local or remote, have been placed in the main queue, they are allowed, in first-in-first-out order, by main queue management thread 1020. If the first request in the queue is local then daemon 1020 sends the location of the frame to access daemon 1022 on processing system 102. If the first request in the queue is remote then daemon 1020 requests the switch-controlling daemon 1023 on processing system 101 to connect processing system 103 with framestore 112, and then sends the location of the frame to access daemon 1021 on processing system 103. These access daemons are unaware of which framestore they are accessing, they simply read a location which they are given.

FIG. 11

Figure 11:
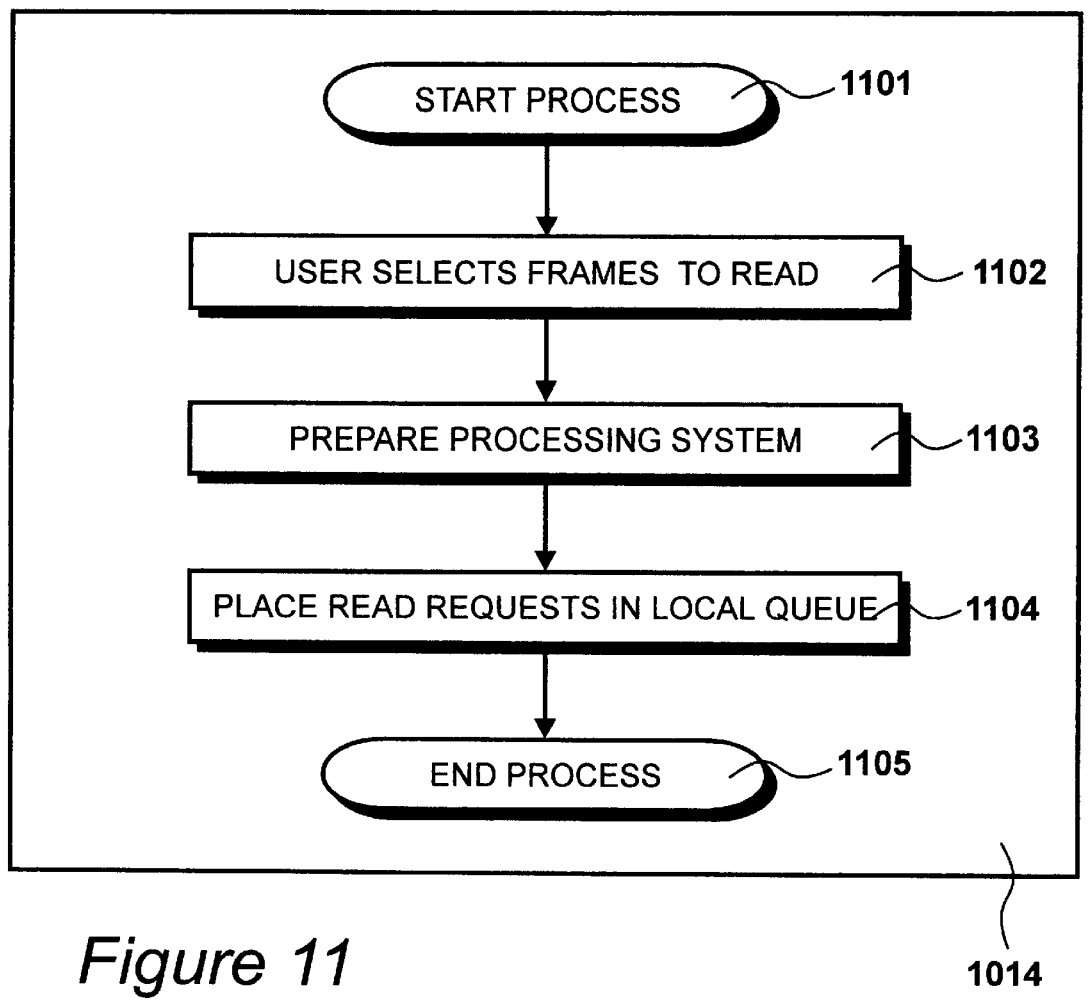
FIG. 11 illustrates a local read daemon as shown in FIG. 10 in which a processing system requests to read from its own framestore.

FIG. 11 illustrates local request process 1014. This process is resident on each of processing systems 101 to 108 but in this example is executed by processing system 102.

At step 1101 the process is started by the user of processing system 102 indicating that he would like to read frames from framestore 112. At step 1102 the user selects the frames that he would like to read.

At step 1103 processing system 102 is prepared for the read process.

At step 1104 one read request for each frame selected is placed in local queue 1015 and at step 1105 the process ends.

FIG. 12

Figure 12:
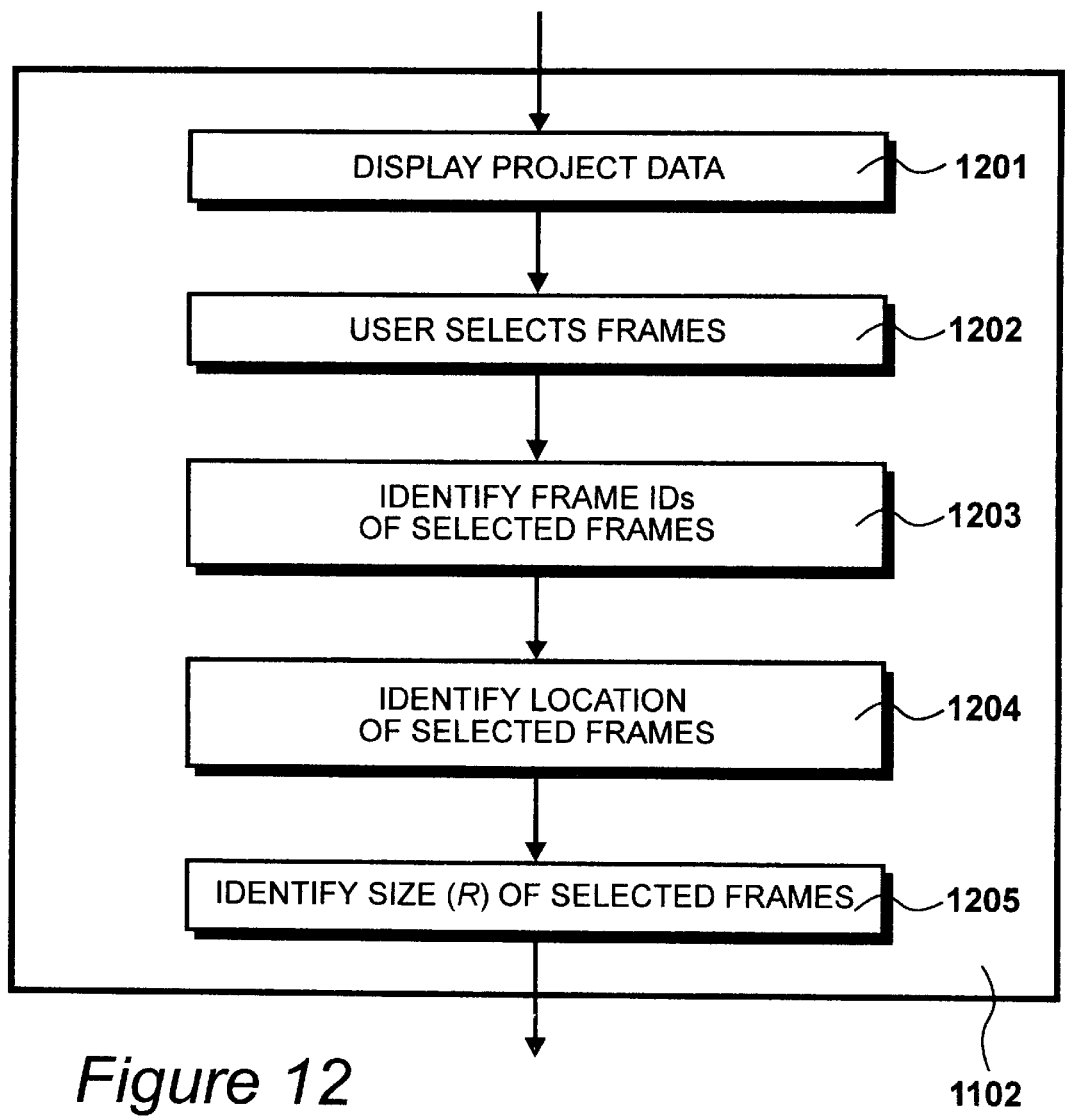
FIG. 12 details steps carried out in FIG. 11 at which a user selects frames to locally read.

FIG. 12 details step 1102 at which the user selects frames to read. At step 1201 metadata 1041 on processing system 102 is read and the project data contained within it is displayed to the user in a format suited to the application and operating system currently running.

At step 1202 the user selects data which he wishes to read. This data may be individual frames or entire clips but must come from the same project, ensuring that all the frames requested are of the same size. This is guaranteed by only displaying one project at a time to the user.

At step 1203 the frame IDs of the selected frames are identified and at step 1204 the locations of the frames are identified by examining the location data 601 within metadata 1041.

At step 1205 the size of the frames is identified and labelled R. This identification is made by examining the location of the first selected frame. As shown in FIG. 7, the first two digits of the location give the partition, and therefore the size, of the frame. Since all the frames are the same size, only one identification of size need be made.

FIG. 13

Figure 13:
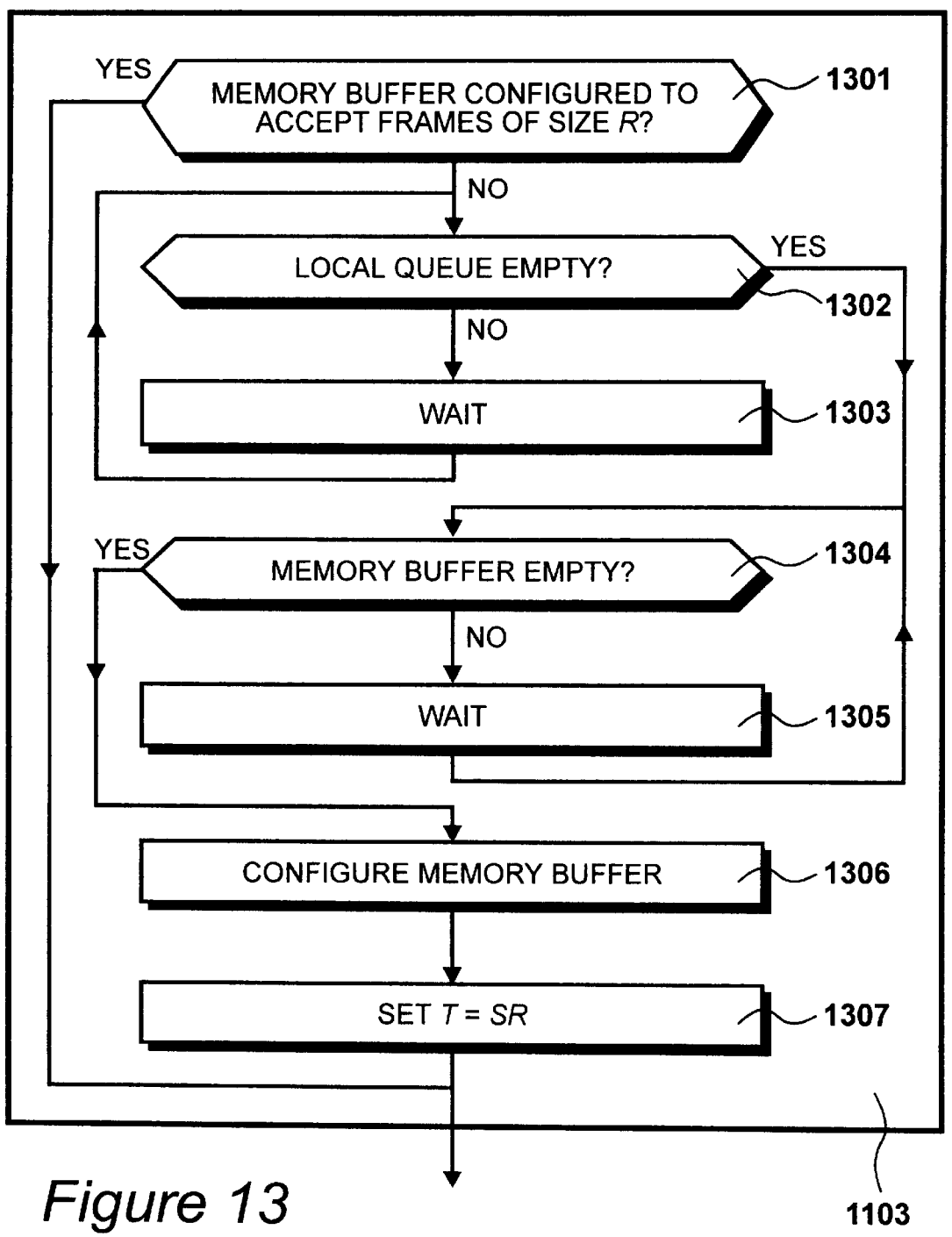
FIG. 13 details steps carried out in FIG. 11 to check that a processing system is ready to locally read.

FIG. 13 details step 1103 at which processing system 102 is prepared for the local read process. At step 1301 the question is asked as to whether memory buffer 1016 is presently configured to accept frames of size R. If this question is answered in the negative then the memory buffer must be reconfigured. Hence at step 1302 the question is asked as to whether local queue 1015 is empty, since the buffer cannot be reconfigured if requests for the previous size of frame are still pending.

If this question is answered in the negative then at step 1303 the process waits for a specified amount of time before returning to ask again at step 1302 if the local queue is empty. This loop will be repeated until the local queue is empty at which point this question will be answered in the affirmative and control will be directed to step 1304. Here the question is asked as to whether memory buffer 1016 is empty.

If this question is answered in the negative then at step 1305 the process again waits before returning to ask whether the buffer is empty at step 1304. Again, this loop will be repeated until the buffer is empty at which point the question asked at step 1304 will be answered in the affirmative.

At step 1306 memory buffer 1016 is configured to accept frames of size R and at step 1307 the current value of T is calculated by multiplying the preset value S with R, the size of the frames. The processing system is now ready.

If the question asked at step 1301 is answered in the affirmative, i.e., memory buffer 1016 is already configured to receive frames of size R, then there is no need to ask whether the local queue or buffer are empty because the buffer does not need reconfiguring and T is already correctly set. Hence if the question is answered in the affirmative then step 1103 is immediately completed.

FIG. 14

Figure 14:
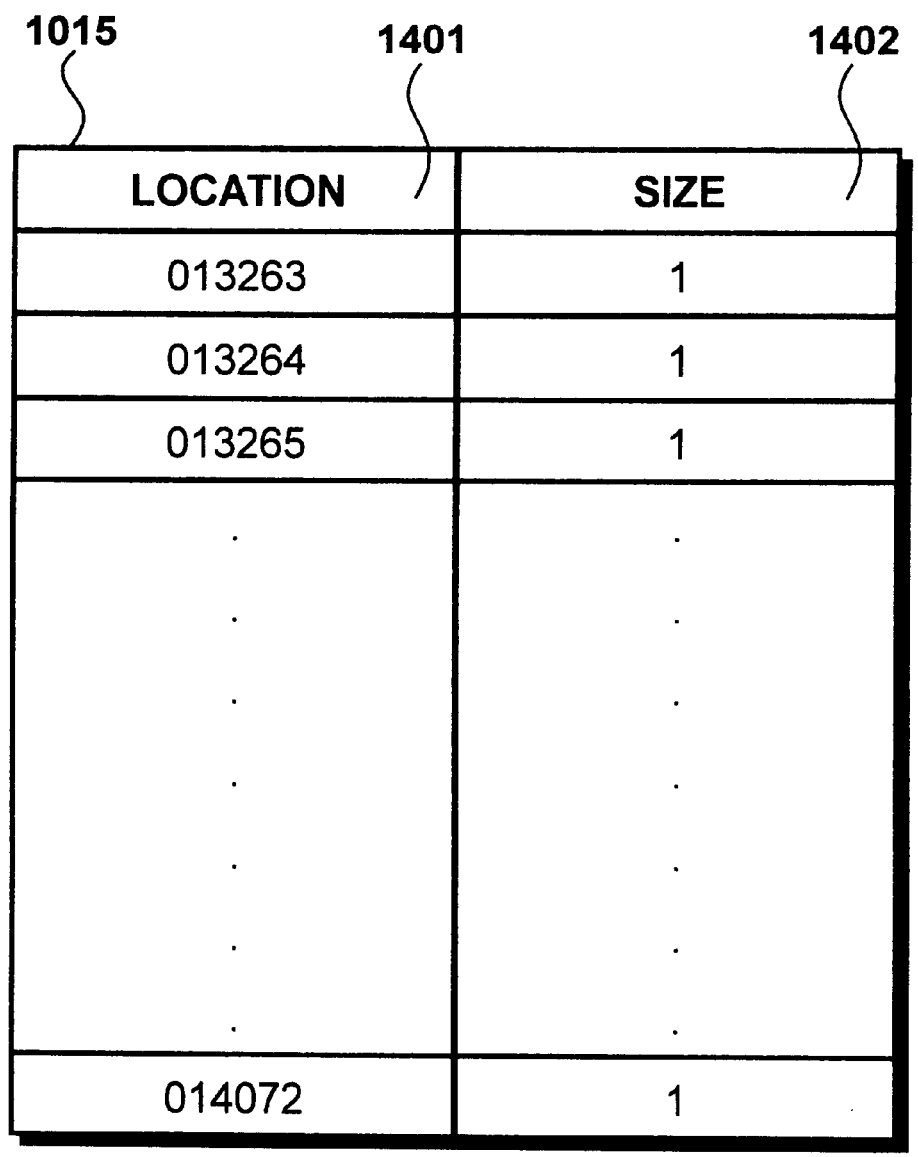
FIG. 14 illustrates a local queue as shown in FIG. 10 in which local read requests are stored.

FIG. 14 illustrates local queue 1015 into which process 1014 places read requests. Column 1401 gives the location of a frame and column 1402 gives the size of the frames. All requests are for framestore 112 and hence there is no need to identify the framestore ID, and the frame ID is only necessary to identify the location, which has been done.

FIG. 15

Figure 15:
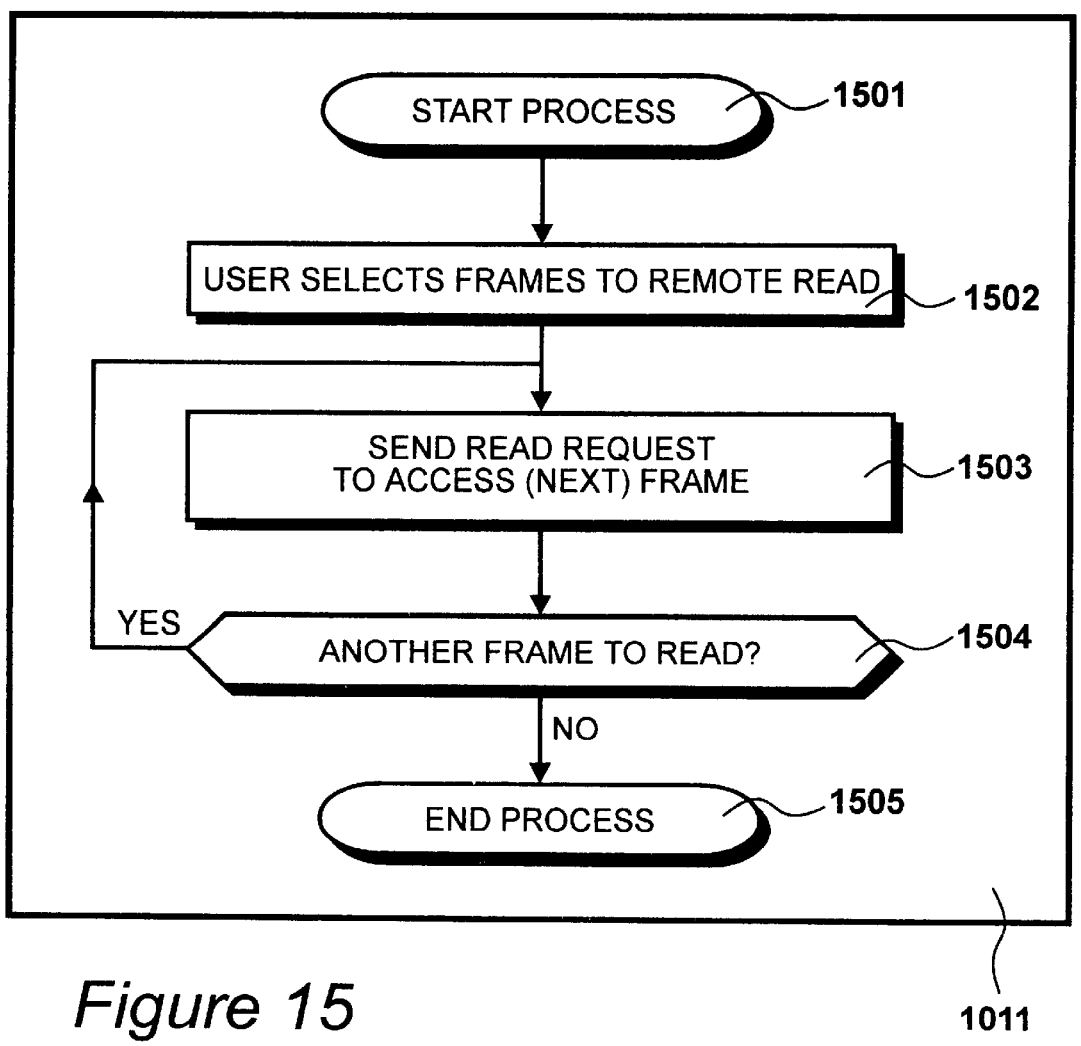
FIG. 15 illustrates a remote read process as shown in FIG. 10 in which a processing system requests access to a remote framestore.

FIG. 15 illustrates process 1011, the remote read process. This process is resident on each of the processing systems 101 to 108 but in this example is executed by processing system 103. At step 1501 the process starts when the user of processing system 103 indicates that he would like to read data which is not stored on framestore 113.

At step 1502 the user selects the frames which he would like to remote read and at step 1503 a read request is sent to the processing system which controls the framestore on which the selected data is stored. This request is only for the first frame and hence at step 1504 the question is asked as to whether there is another frame selected. If this question is answered in the affirmative then control is redirected to step 1503 at which this next frame is requested from the controlling processing system.

Eventually, when each of the selected frames has been requested one by one, the question asked at step 1504 is answered in the negative. At this point control is directed to step 1505 where the process ends.

FIG. 16

Figure 16:
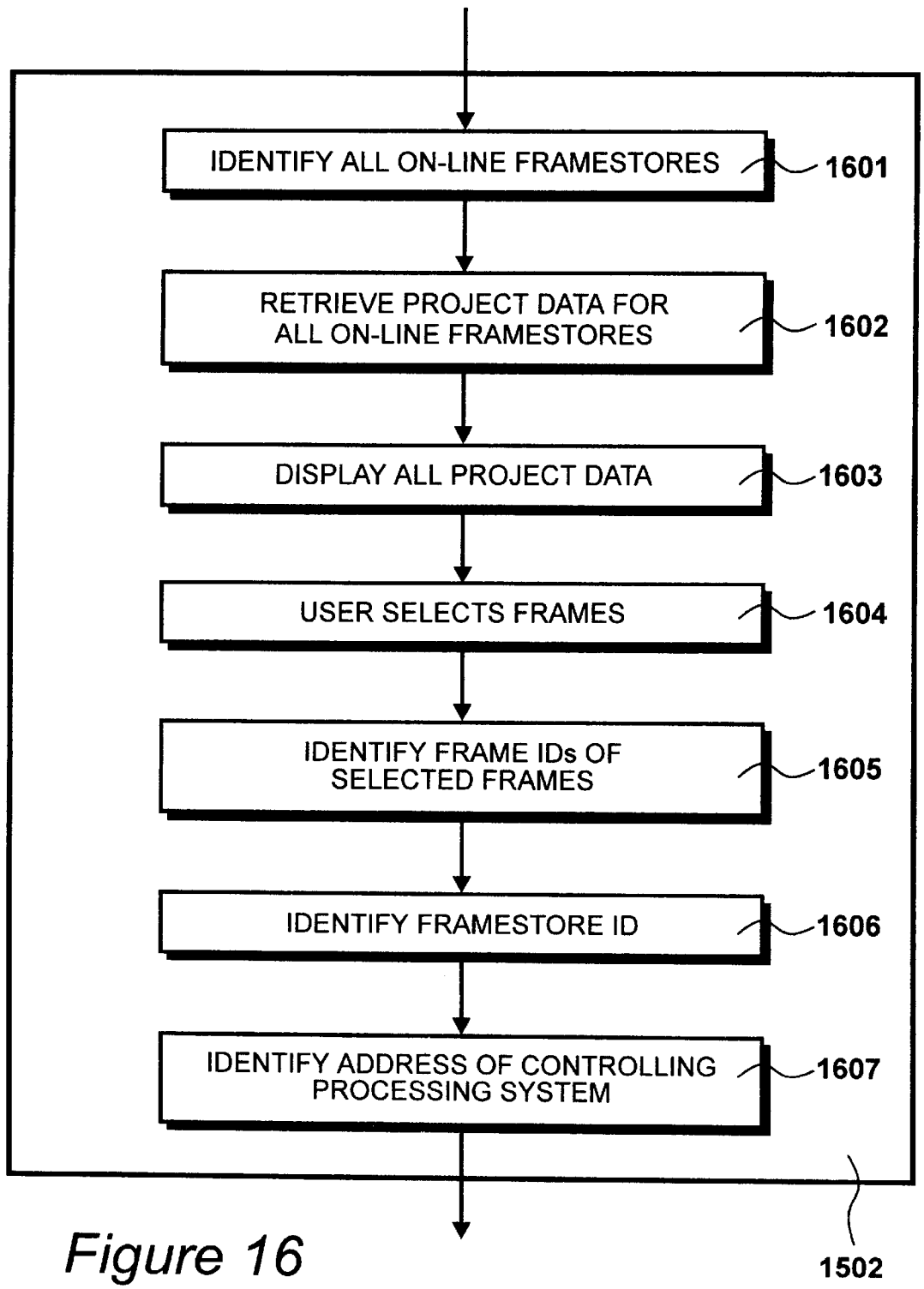
FIG. 16 details steps carried out in FIG. 15 at which a user selects frames to remote read.

FIG. 16 details step 1502 at which the user selects the frames that he would like to remote read. At step 1601 network configuration file 1053 on processing system 103 is interrogated to identify all framestores which are available to access. At 1602 the project data contained in each of their metadata is retrieved. This part of the metadata on every processing system is freely available via the Ethernet or HiPPI so that frames may be chosen, but location and user data is kept hidden so that a processing system may only see that data for its own framestore. This ensures that unauthorised access is not made.

At step 1603 the project data for all on-line framestores is displayed to the user of processing system 103, in a format depending on the application and operating system currently running. At step 1604 the user selects frames which he wishes to access. These may be individual frames or entire clips and may be from different projects but must all be stored on the same framestore. This is ensured by only displaying project data for one framestore at once. If the user wishes to access data stored on two different framestores he must run this process twice.

At step 1605 the frame IDs of the selected frames are identified and at step 1606 the framestore ID of the framestore on which these frames are stored is identified, which in this example is framestore 112 with ID 56. As shown in FIG. 7, the framestore ID is always the first two digits of a frame ID and so is easily identified. In addition, since all frames must be stored on the same framestore, only one frame ID needs to be examined to find the framestore ID.

At step 1607 network configuration file 1053 is again interrogated to identify the Ethernet address of the processing system which controls the framestore with the ID identified at step 1905, which in this example is processing system 102. Requests can now be sent to this address at step 1503.

FIG. 17

Figure 17:
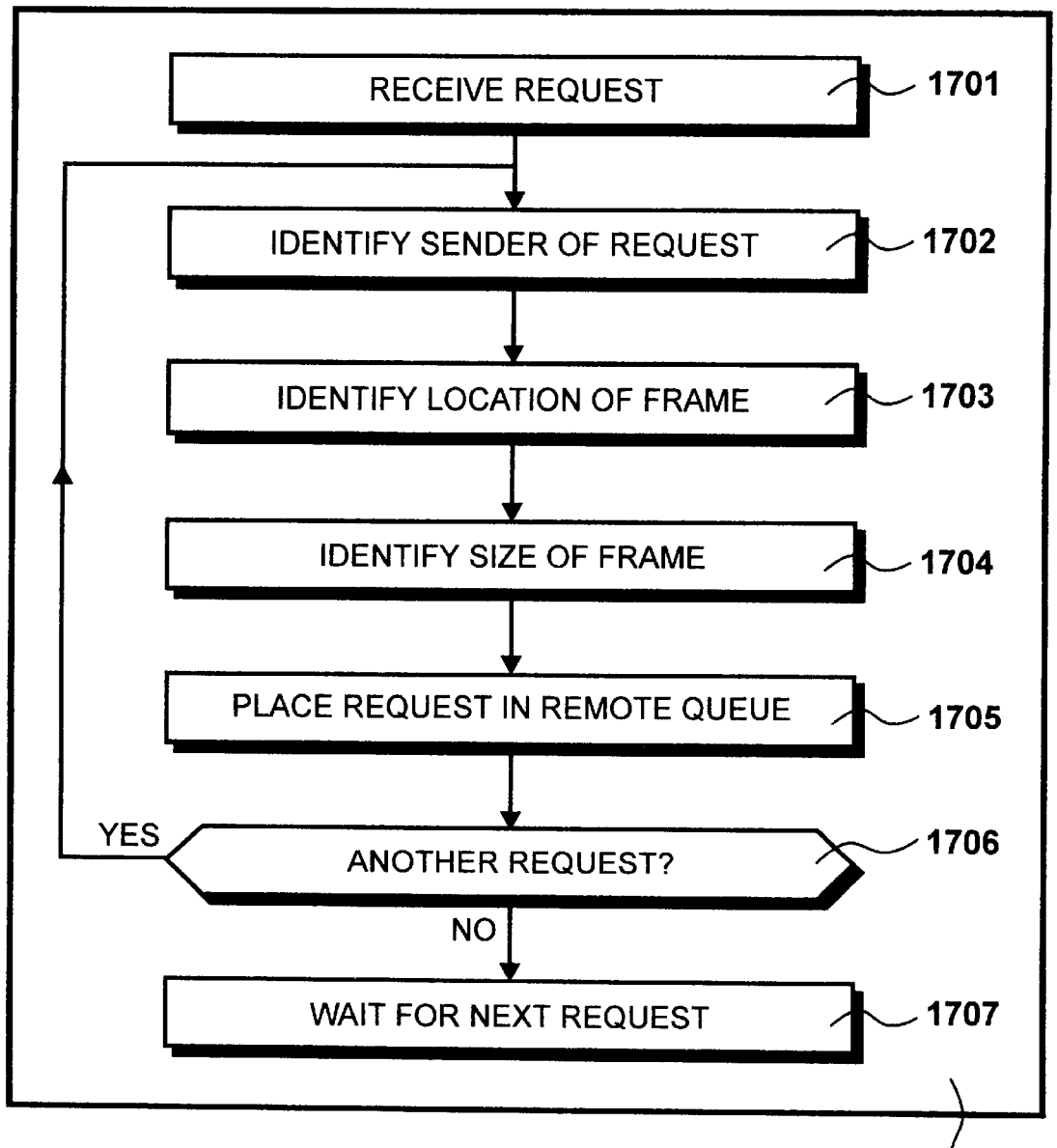
FIG. 17 illustrates a remote queue thread as shown in FIG. 10 which places remote read requests in a remote queue.

FIG. 17 illustrates remote queue thread 1012 on processing system 102 which receives remote read requests. These requests may be sent by any of processing systems 101 and 103 to 108, but in this example the requests are sent by processing system 103.

The thread is executed by each of processing systems 101 to 108 but in this example is executed by processing system 102.

Remote queue thread 1012 starts when at step 1701 a remote read request is received from processing system 103. At step 1702 the Ethernet address of the sender of the request is identified.

At step 1703 the location of the requested frame is identified and at step 1704 the size of the requested frame is identified.

At step 1705 the request is placed in remote queue 1013.

At step 1706 the question is asked as to whether another request has arrived. If this question is answered in the affirmative then control is returned to step 1702 and the sender is identified. If the question asked at step 1706 is answered in the negative then at step 1707 the thread waits for another request to be received, when control is returned to step 1702.

FIG. 18

FIG. 18 illustrates an example of remote access queue 1013. Column 1801 identifies the Ethernet address of the sender of the request, column 1802 gives the location of the requested frame and column 1803 gives the size of the frame. Within remote queue 1013 there may be read requests from any processing systems within the network and each is dealt with strictly in the order in which it arrived. Hence, although the requests from processing system 103 have been placed in the queue, as shown by lines 1813, there are already requests in the queue from two other processing systems, as shown by lines 1811 and lines 1812.

FIG. 19

Figure 19:
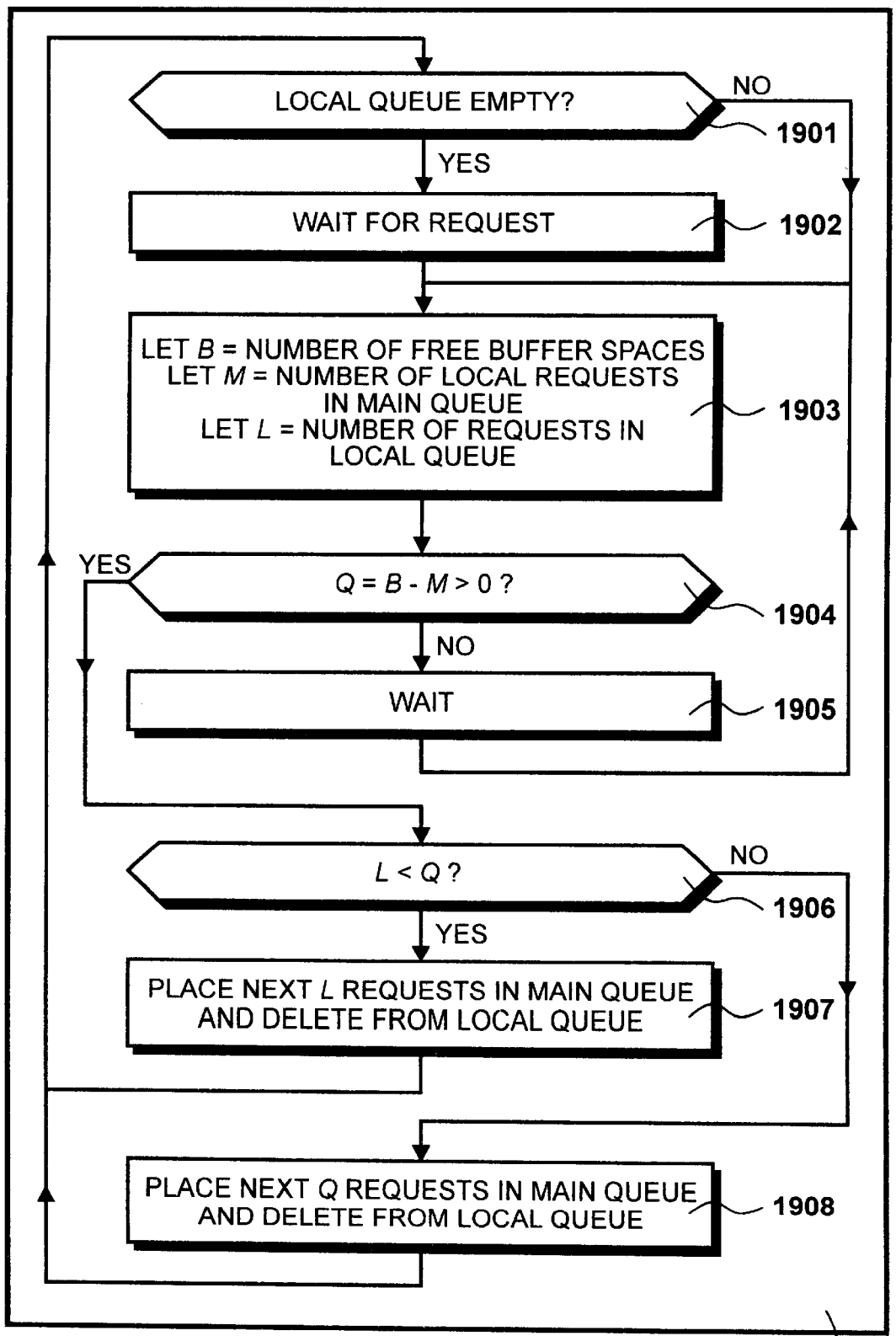
FIG. 19 illustrates a local queue management thread as shown in FIG. 10 which places requests from a local queue into a main queue.

Local queue management thread 1017 is illustrated in FIG. 19. This thread identifies the amount of access needed by processing system 102 by considering the amount of space in buffer 1018 and how many requests are in local queue 1017. Thread 1017 is executed by each of processing systems 101 to 108 but in this example is executed by processing system 102. It runs constantly while processing system 102 is turned on.

At step 1901 the question is asked as to whether there are any requests in local queue 1015. If this question is answered in the negative then at step 1902 the thread waits for a local request to arrive. At this point, and if the question asked at step 1901 is answered in the negative, control is directed to step 1903 at which variables B, M and L are set. B is set to be the number of free buffer spaces in buffer 1016. This can be calculated since the buffer is configured to accept frames of a specific size. M is set to be the number of local requests in main queue 1019 and L is set to be the number of local requests in local queue 1015.

At step 1904 the variable Q is set to be B—N, i.e., the number of free buffer spaces minus the number of pending local requests, and the question is asked as to whether Q is greater than zero, i.e., whether the number of local requests in the main queue is great enough to fill the free spaces in the buffer. If this question is answered in the negative, i.e., there are enough requests in the main queue for the present, then the thread waits at step 1905 for a specified amount of time, which in this example is half a second, before returning control to step 1903 and recalculating B and N.

If the question asked at step 1904 is answered in the affirmative, i.e., there are not enough local requests in the main queue to fill the buffer, then at step 1906 the question is asked as to whether L, the number of requests in the local queue, is less than Q. If this question is answered in the affirmative then at step 1907 all L requests in the local queue are placed in the main queue and deleted from the local queue.

If the question asked at step 1906 is answered in the affirmative then at step 1908 the next Q requests in the local queue are placed in the main queue and deleted from the local queue.

Control is now returned to step 1901 at which the question is asked as to whether there are more requests in the local queue. Hence at all times the number of local requests in the main queue is almost exactly the number of requests needed to fill up the buffer, unless there have not been enough requests made.

FIG. 20

Figure 20:
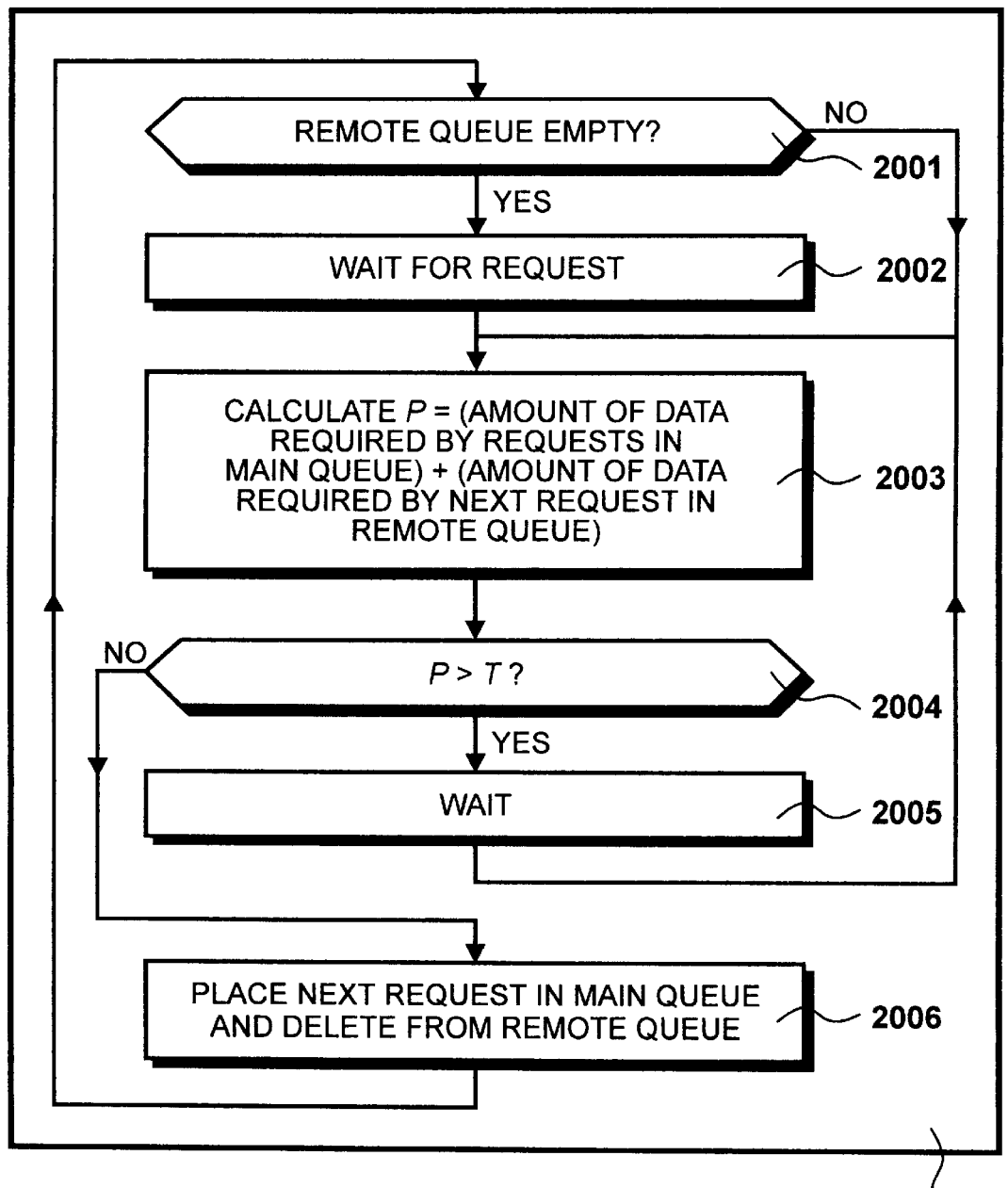
FIG. 20 illustrates a remote queue management thread as shown in FIG. 10 which places requests from a remote queue into a main queue.

FIG. 20 illustrates remote queue thread 1018 which places requests from remote queue 1013 into main queue 1019 according to the number of requests already in the main queue. This thread runs constantly while processing system 102 is switched on.

At step 2001 the question is asked as to whether the remote queue is empty. If this question is answered in the affirmative then control is directed to step 2002 at which the thread waits for a request to arrive.

At this point, and if the question asked at step 2001 is answered in the negative, control is directed to step 2003 at which a value P is determined. P is calculated as the total amount of data required by the requests in the main queue plus the amount of data required by the first request in the remote queue. For example, FIG. 21 shows main queue 1019, and the sum of the sizes of the requests is 19 megabytes. Reference to FIG. 18 shows that the first request in the remote queue 1013 requires 4 megabytes. Hence P is calculated at 23.

At step 2004 the question is asked as to whether P is greater than T, i.e., whether placing the first request from the remote queue into the main queue will cause the sum of the required data in the main queue to exceed T. If this question is answered in the affirmative then at step 2005 the thread waits for a specified period of time, which in this example is 1 second, before returning to step 2003 to recalculate P.

If the question asked at step 2004 is answered in the negative then at step 2006 the remote request is placed in main queue 1019 before being deleted from remote queue 1013 at step 2007.

Control is now returned to step 2001 at which the question is asked as to whether there is another request in the remote queue.

FIG. 21

FIG. 21 shows an example of main queue 1019. Column 2101 gives the issuer of the request. For a local request this column remains empty, thus allowing the number of local requests in the main queue to be easily calculated. Column 2102 gives the location of a request and column 2103 gives the size of the requested frame.

FIG. 22

Figure 22:
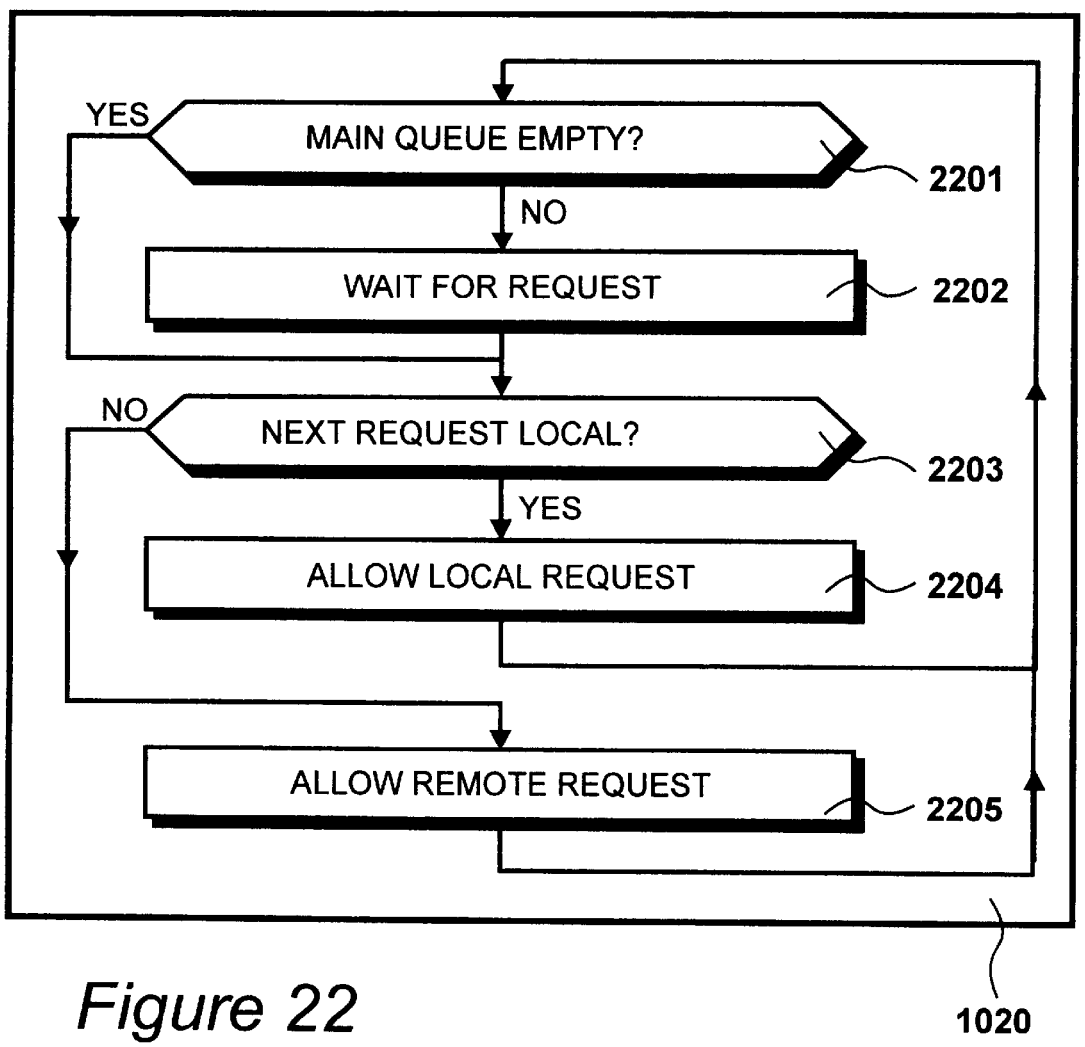
FIG. 22 illustrates a main queue management thread which allows access to a framestore according to requests in a main queue.

FIG. 22 illustrates main queue management thread 1020 which allows access to the framestore for the requests in main queue 1019. At step 2201 the question is asked as to whether the main queue is empty. If this question is answered in the affirmative then at step 2202 the thread waits for a request to arrive.

At this point, and if the question asked at step 2201 is answered in the negative, control is directed to step 2203 at which the question is asked as to whether the next request in main queue 1019 is local. If this question is answered in the affirmative then at step 2204 procedures for allowing a local request are carried out. If the question is answered in the negative then at step 2205 procedures for allowing a remote request are carried out. When step 2204 or 2205 is completed control is returned to step 2201 and the question is asked as to whether there is another request in the main queue.

FIG. 23

Figure 23:
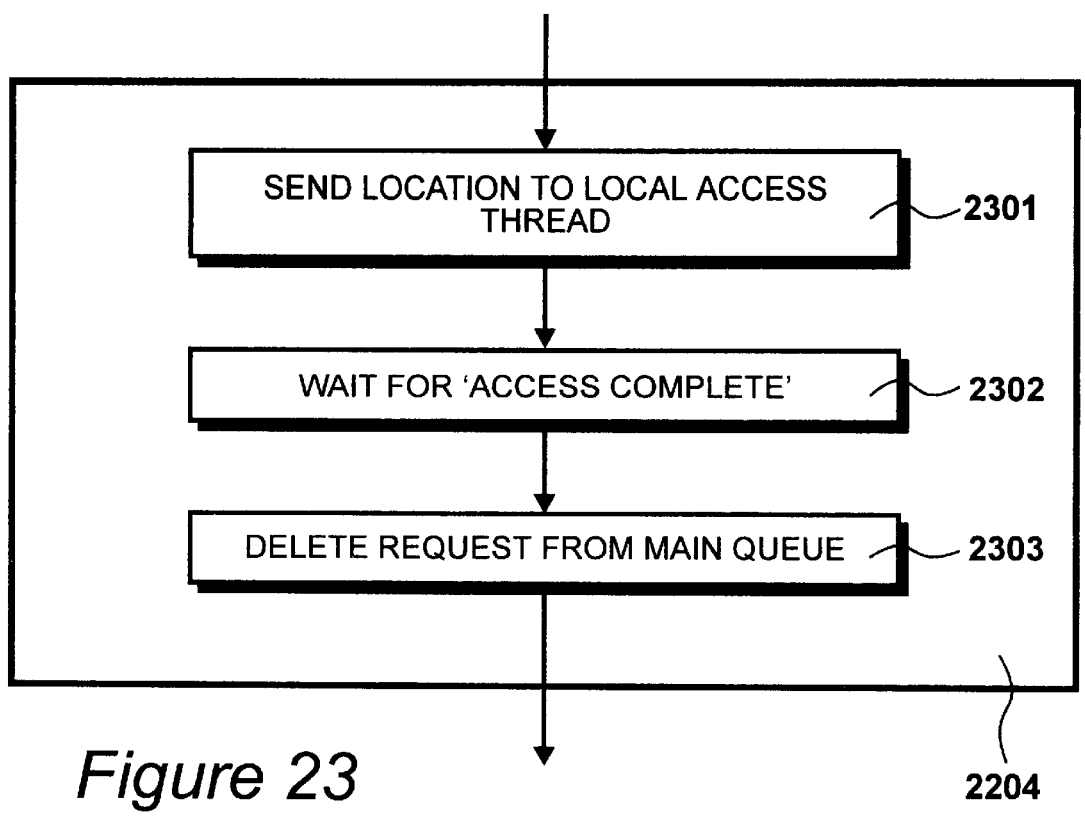
FIG. 23 details steps carried out in FIG. 22 to allow local access.

FIG. 23 details step 2204, at which a local request is allowed. At step 2301 the location of the next request is sent to access thread 1022 on processing system 102. At step 2302 the thread waits for 'ACCESS COMPLETE' to be returned from thread 1022 and at step 2303 the request is deleted from the main queue.

FIG. 24

Figure 24:
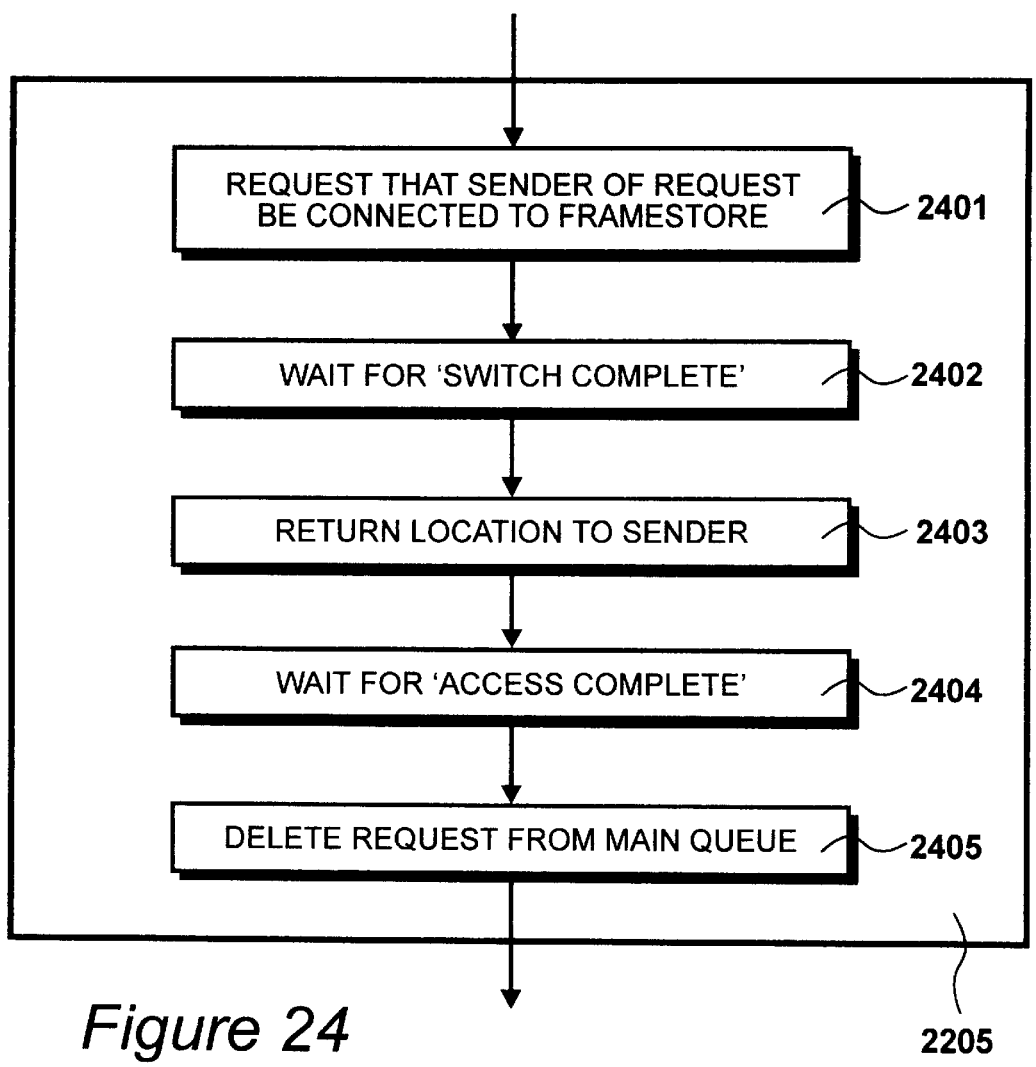
FIG. 24 details steps carried out in FIG. 22 to allow remote access.

FIG. 24 details step 2205, at which a remote request is allowed. At step 2401 a message is sent to switch-controlling thread 1023 on processing system 101. This thread controls the connections within fibre channel switch 121, and the message instructs it to connect the sender of the remote request, which in this example is processing system 103, with framestore 112.

At step 2402 the thread waits for 'SWITCH COMPLETE' before sending the location of the requested frame to access thread 1021 on processing system 103 at step 2403.

At step 2404 the thread waits for 'ACCESS COMPLETE' to be returned from thread 1021 and at step 2405 the request is deleted from the main queue.

FIG. 25

Figure 25:
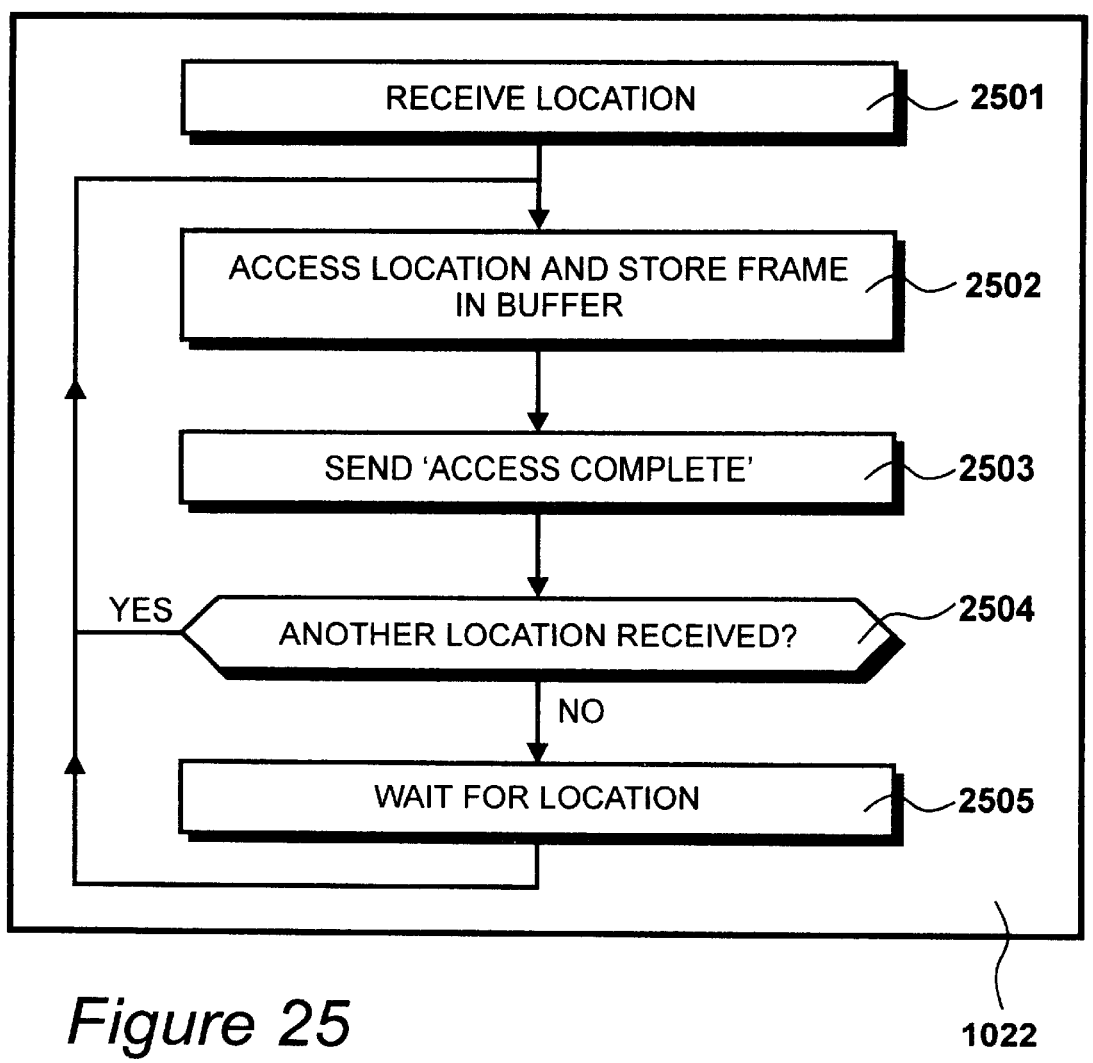
FIG. 25 illustrates a local access thread as shown in FIG. 10 at which a processing system locally accesses its own framestore.

FIG. 25 illustrates local access thread 1022 on processing system 102. Threads executed by each of processing systems 101 and 103 to 108 are identical to this. Thread 1021 runs constantly while processing system 102 is switched on.

At step 2501 the thread receives a location from main queue management thread 1020, also running on processing system 102, and at step 2502 the thread accesses this location and stores the frame in buffer 1016.

At step 2503 the message 'ACCESS COMPLETE' is sent to main queue management thread 1020.

At step 2504 the question is asked as to whether another location has been received. If this question is answered in the affirmative then control is returned to step 2502 and the location is accessed. If the question is answered in the negative then at step 2505 the thread waits for another location before returning to step 2502.

FIG. 26

Figure 26:
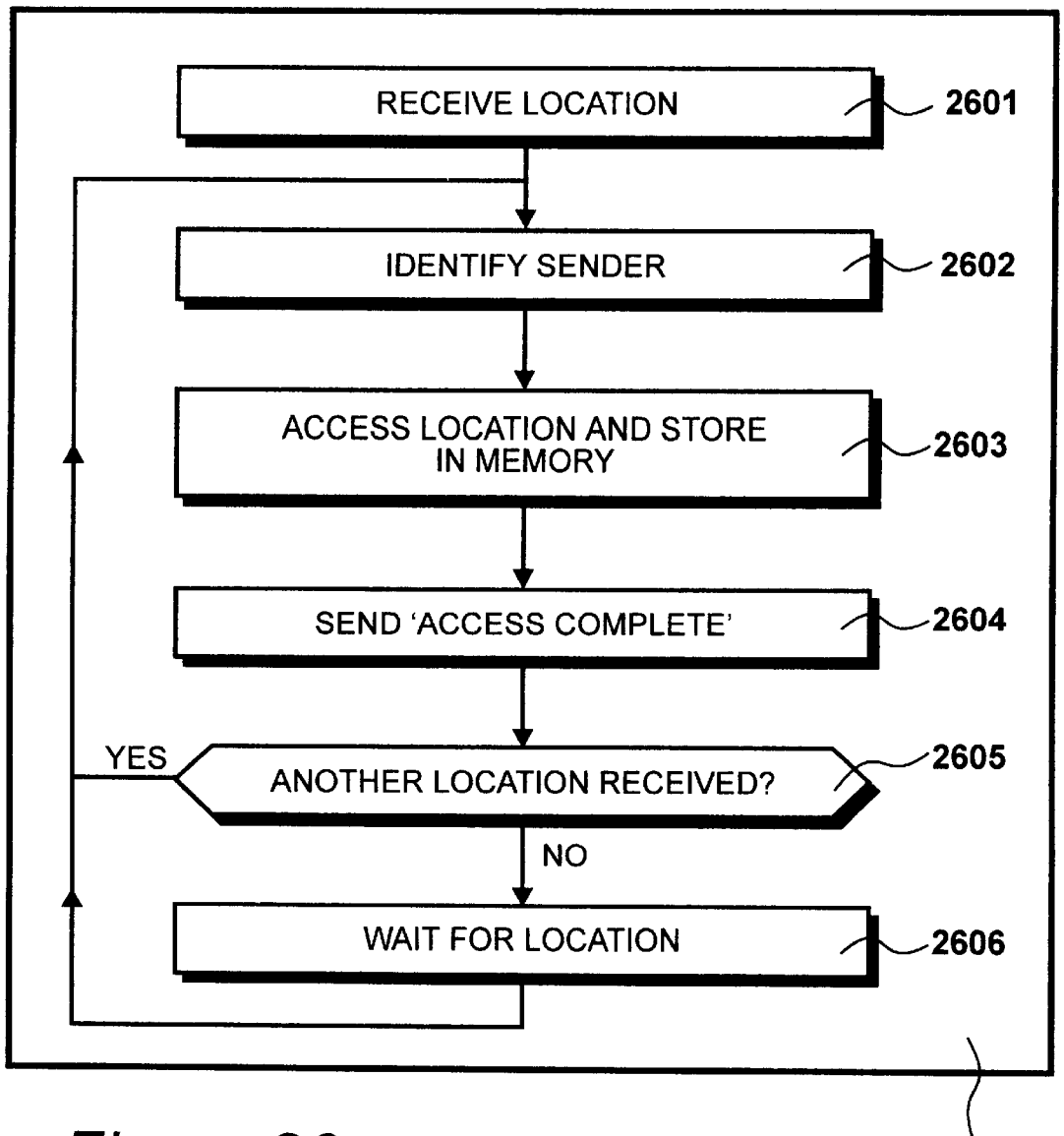
FIG. 26 illustrates a remote access daemon as shown in FIG. 10 at which a processing system remotely accesses a framestore.

FIG. 26 illustrates remote access thread 1021 on processing system 103. An identical thread runs on each of processing systems 101, 102 and 104 to 108. Thread 1021 runs constantly while processing system 103 is switched on.

At step 2601 a location is received from a main queue management thread on another processing system, which in this example is thread 1020 on processing system 102, and at step 2602 the processing system which sent the location is identified.

At step 2603 the location is accessed and the frame is stored in memory. This access takes exactly the same form as local access of a framestore, since the remote framestore is connected to processing system 103 and a location has been supplied, just as with local access.

At step 2604 the message 'ACCESS COMPLETE' is sent to the processing system identified at step 2602, which in this case is processing system 102, to be 'caught' by the main queue management thread on that system, which in this case is thread 1020. The message is also sent to switch-controlling thread 1023, which instructs it to reset the fibre channel switch.

At step 2605 the question is asked as to whether another location has been received. If this question is answered in the affirmative then control is returned to step 2602 and the sender is identified. If the question is answered in the negative then at step 2606 the thread waits for another location before returning to step 2602.

FIG. 27

Figure 27:
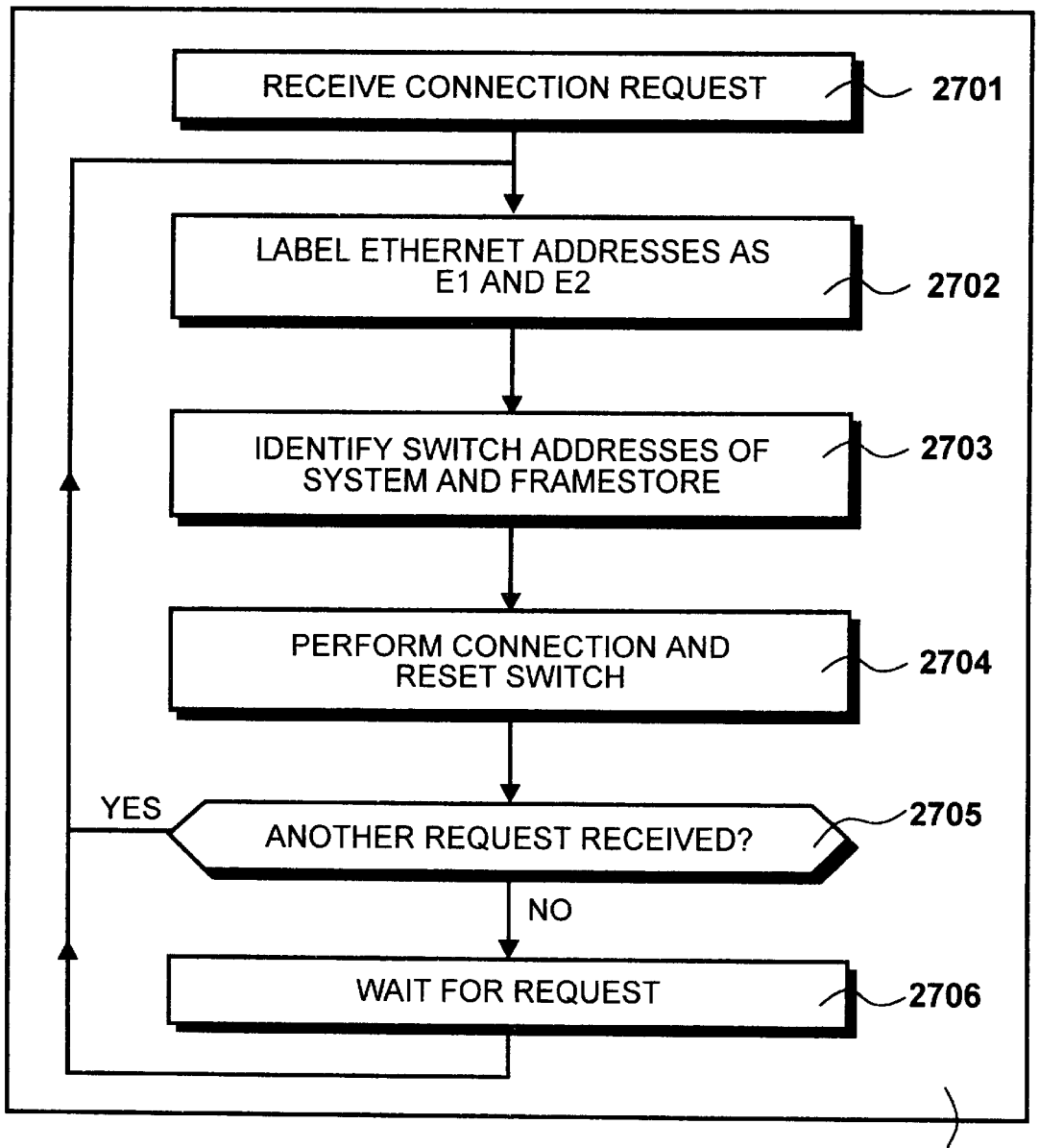
FIG. 27 illustrates a switch-controlling thread as shown in FIG. 10.

FIG. 27 illustrates switch control thread 1023 on processing system 101 which controls the connections made within fibre channel switch 121. This thread is not executed by any of processing systems 102 to 108 since there can be only one program controlling the switch. The thread runs constantly while processing system 101 is switched on.

At step 2701 a switch request is received. This request is in the form of a message containing the Ethernet addresses firstly of the remote processing system, in this case processing system 103, and secondly the address of the processing system which controls the framestore in question. At step 2702 these Ethernet addresses are labelled E1 and E2 respectively.

At step 2703 the necessary switch addresses are found which correspond to E1 and E2. Switch addresses are the addresses within fibre channel switch 121 which the thread uses to connect processing systems with framestores.

At step 2704 the requisite connection is made and then the switch is reset.

At step 2705 the question is asked as to whether another request has been received. If this question is answered in the affirmative then control is returned to step 2602 and the Ethernet addresses are labelled. If the question is answered in the negative then at step 2706 the thread waits for another location before returning to step 2702.

FIG. 28

Figure 28:
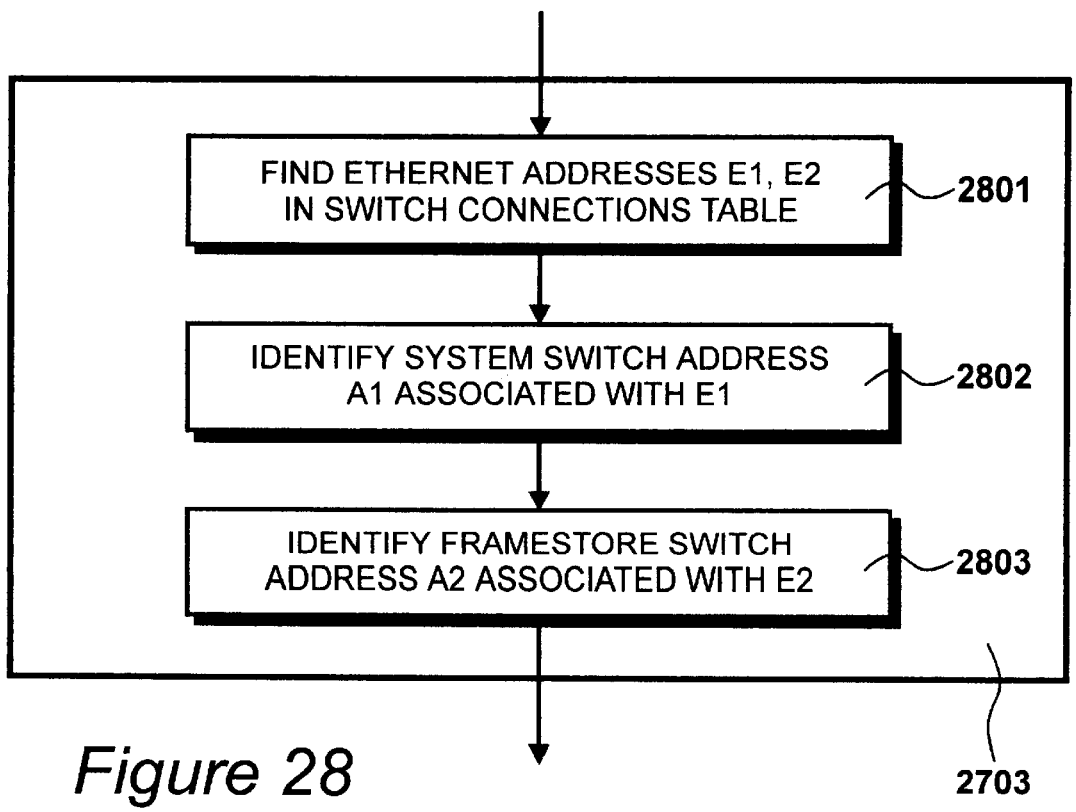
FIG. 28 details steps carried out in FIG. 27 to identify addresses within the switch.

FIG. 28 details step 2703 at which the switch addresses are identified. At step 2801 switch connections table 342 is examined to find the two Ethernet addresses E1 and E2 in column 801.

At step 2802 the system switch address associated with Ethernet address E1 is found from column 802 and labelled as A1. At step 2803 the framestore switch address associated with Ethernet address E2 is found in column 803 and labelled as A2.

Hence two switch addresses have been found, A1 being the switch address of processing system 103 and A2 being the switch address of framestore 112.

FIG. 29

Figure 29:
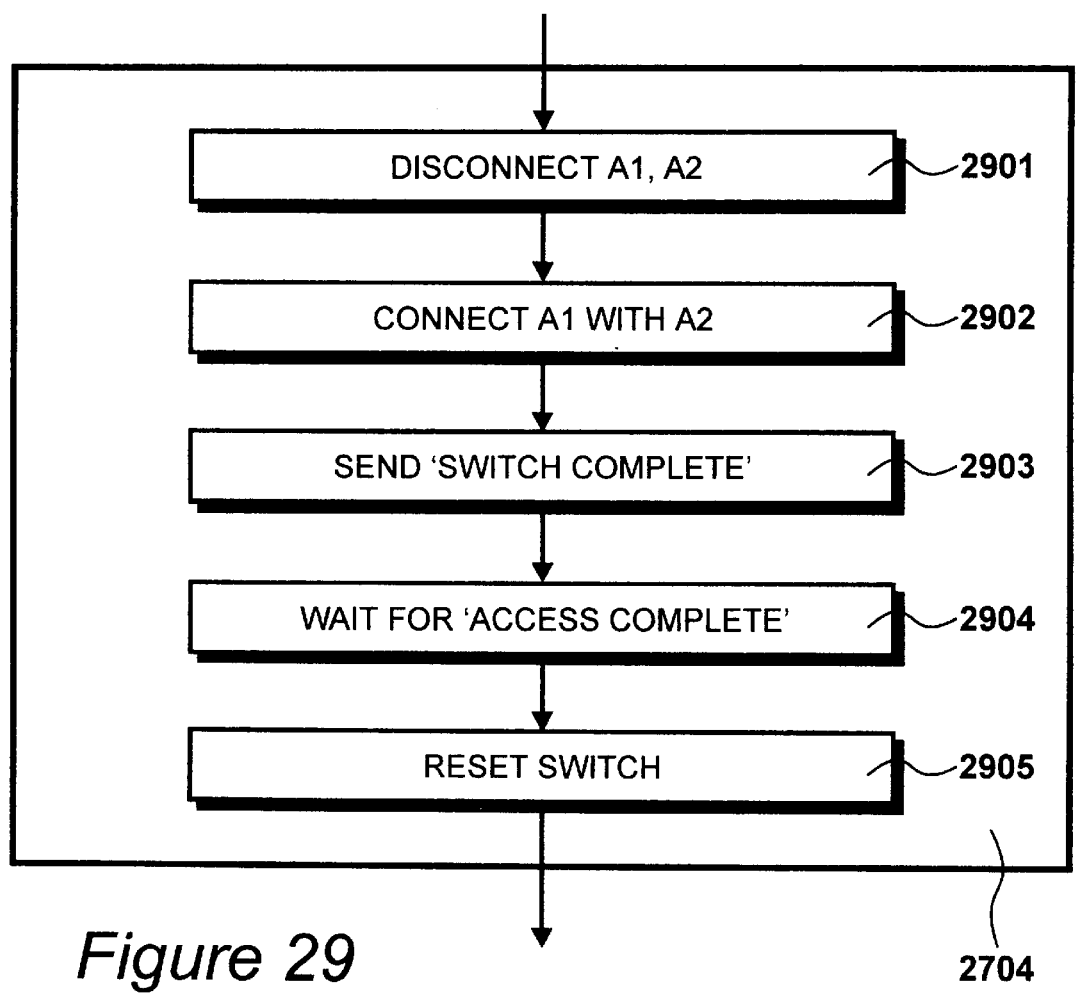
FIG. 29 details steps carried out in FIG. 27 to make connections within the switch.

FIG. 29 details step 2704 at which the connection is made. At step 2901 switch addresses A1 and A2 are disconnected from their current connections and at step 2902 A1 and A2 are connected together.

At step 2903 the message 'SWITCH COMPLETE' is sent to main queue management thread 1020 on processing system 102.

At step 2904 the process waits for the message 'ACCESS COMPLETE' to be received from remote access daemon 1021 on processing system 103. When this is received then at step 2905 the switch is reset according to the connections listed in switch connections table 342.

What is claimed is:

1. Image data processing apparatus comprising:
   a plurality of image data processing systems,
   a plurality of data storage systems, wherein each of said data storage systems is operated under the direct control of one of said image processing systems,
   a high bandwidth network connected to each of said data processing systems and to each of said data storage systems, and
   a low bandwidth network connected to each of said data processing systems; wherein
      a first processing system includes requesting means configured to request access to a data storage system controlled by a second processing system over said low bandwidth network;
      said second processing system includes bandwidth assessment means configured to assess an extent to which said second processing system requires access to said storage system,
      comparison means configured to make an indication of storage regions that may be accessed if said extent is below a predetermined threshold, and
      sending means configured to convey said indication over said low bandwidth network to said first processing system, wherein
         said first processing system includes accessing means configured to access said storage system via said high bandwidth network.

2. Apparatus according to claim 1, wherein said data processing systems are based around a silicon graphics $O_2$, Octane or Onyx2 computer.

3. Apparatus according to claim 1, wherein said data storage systems include a plurality of disks configured to receive image stripes.

4. Apparatus according to claim 3, including redundant disks to provide data security.

5. Apparatus according to claim 4, wherein said disks are configured as a redundant array of inexpensive disks (RAID).

6. Apparatus according to claim 1, wherein said low bandwidth network is an Ethernet network.

7. Apparatus according to claim 1, wherein said high bandwidth network includes a high bandwidth switching means.

8. Apparatus according to claim 7, wherein said high bandwidth switching means is a fibre channel switch.

9. Apparatus according to claim 8, wherein said fibre channel switch is operated under the control of one of said image data processing systems.

10. Apparatus according to claim 1, wherein said processing systems execute programs to identify requests made by other processing systems.

11. Apparatus according to claim 1, wherein at least one image data processing system has direct control of a plurality of data storage systems.

12. Apparatus according to claim 9, including lower powered data processing systems that are configured to supply image data to image data processing systems connected to said high bandwidth switching means.

13. Apparatus according to claim 1, wherein said bandwidth assessment means include:

queuing means configured to queue requests from said second processing system for access to said data storage system controlled by said second processing system, and queue measurement means configured to measure said queue.

14. Apparatus according to claim 1, wherein said bandwidth assessment means include:

accessing means configured to access said storage regions requested by said second processing system and retrieve the stored data;

buffering means configured to buffer said data retrieved from said storage regions; and buffer measurement means configured to measure the amount of data stored in said buffering means.

15. Apparatus according to claim 1, wherein said bandwidth assessment means include:

queuing means configured to queue requests from said second processing system for access to said data storage system controlled by said second processing system, queue measurement means configured to measure said queue;

accessing means configured to access said storage regions requested by said second processing system and retrieve the stored data;

buffering means configured to buffer said data retrieved from said storage regions; and buffer measurement means configured to measure the amount of data stored in said buffering means.

16. Apparatus according to claim 13, wherein said queue measurement means is configured to sum the amount of data requested by each request in said queue.

17. Apparatus according to claim 14, wherein said buffer measurement means is configured to count the number of frames stored in said buffering means.

18. Apparatus according to claim 14, wherein said buffer measurement means is configured to sum the amount of data in the frames stored in the buffering means.

19. A method of transferring data in a networked image data processing environment, including a plurality of image data processing systems, a plurality of data storage systems; a high bandwidth network connected to each of said data processing systems and to each of said storage systems; and a low bandwidth network connected to said image processing systems, wherein said method comprises:

operating each of said data storage systems under the direct control of one of said image processing systems;

issuing a request from a first processing system to access a data storage system controlled by said second processing system over said low bandwidth network;

using bandwidth assessment means at said second processing system to assess an extent to which said second processing system requires access to said storage system;

using comparison means at said second processing system to make an indication of storage regions that may be accessed if said extent is below a predetermined threshold;

making an identification at said second processing system of said storage regions that may be accessed;

conveying said identification from said second processing system to said first processing system over said low bandwidth network; and accessing said identified storage portion by said first processing system via said high bandwidth network.

20. The method according to claim 19, wherein the extent to which access to sort storage is assessed includes measuring the depth of a queue for request for access by a local processing system.

* * * * *